United States Patent
Mizoguchi

(10) Patent No.: US 9,681,015 B2
(45) Date of Patent: Jun. 13, 2017

(54) OPTICAL DEVICE, OPTICAL SCANNER, AND IMAGE DISPLAY APPARATUS

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 99 days.

(21) Appl. No.: 14/301,688

(22) Filed: Jun. 11, 2014

(65) Prior Publication Data

US 2014/0368892 A1 Dec. 18, 2014

(30) Foreign Application Priority Data

Jun. 12, 2013 (JP) ................................ 2013-123469

(51) Int. Cl.
G02B 26/10 (2006.01)
H04N 1/036 (2006.01)
G02B 26/08 (2006.01)

(52) U.S. Cl.
CPC ........... *H04N 1/036* (2013.01); *G02B 26/085* (2013.01); *G02B 26/101* (2013.01)

(58) Field of Classification Search
CPC .... G02B 26/085; G02B 26/10; G02B 26/121; G02B 26/101; G01N 21/0303
USPC ......... 359/197.1, 198.1, 199.1, 199.3, 200.7, 359/201.1, 201.2, 202.1, 212.1, 213.1, 359/24.1
See application file for complete search history.

(56) References Cited

U.S. PATENT DOCUMENTS

| 7,724,411 B2 | 5/2010 | Ko et al. | |
| 2002/0132062 A1* | 9/2002 | Jacobs | G02B 26/0841 427/569 |
| 2004/0100679 A1* | 5/2004 | Kuo | G02B 26/0841 359/291 |
| 2007/0279726 A1* | 12/2007 | Kato | G02B 26/085 359/224.1 |
| 2008/0094677 A1 | 4/2008 | Mizoguchi | |
| 2009/0296181 A1* | 12/2009 | Omori | G02B 26/0841 359/224.1 |
| 2010/0046052 A1* | 2/2010 | Mizoguchi | G02B 26/101 359/199.3 |
| 2010/0195180 A1 | 8/2010 | Akanuma et al. | |
| 2012/0086996 A1* | 4/2012 | Mizoguchi | H04N 1/113 359/198.1 |

(Continued)

FOREIGN PATENT DOCUMENTS

| JP | 2008-076695 A | 4/2008 |
| JP | 2008-102362 A | 5/2008 |
| JP | 2009-075587 A | 4/2009 |

(Continued)

*Primary Examiner* — Stephone B Allen
*Assistant Examiner* — Rahman Abdur
(74) *Attorney, Agent, or Firm* — Harness, Dickey & Pierce, P.L.C.

(57) ABSTRACT

An optical device includes: a movable section capable of swinging about a first axis; a frame body section capable of swinging about a second axis crossing the first axis; a first shaft section configured to connect the movable section and the frame body section; and a light reflection plate fixed to the movable section and provided with a light reflecting section having light reflectivity, wherein in plan view from a thickness direction of the light reflection plate, a center of gravity of the light reflection plate is shifted from the first axis.

16 Claims, 16 Drawing Sheets

(56) References Cited

U.S. PATENT DOCUMENTS

2012/0228460 A1   9/2012  Suzuki
2013/0063799 A1*  3/2013  Honda .................. B81B 3/0032
                                                    359/200.7

FOREIGN PATENT DOCUMENTS

| JP | 2010-197994 A | 9/2010 |
| JP | 2011-053253 A | 3/2011 |
| JP | 2012-058527 A | 3/2012 |
| JP | 2012-075312 A | 4/2012 |
| JP | 2012-208395 A | 10/2012 |
| JP | 2013-097026 A | 5/2013 |
| JP | 2013-105117 A | 5/2013 |

* cited by examiner

FIRST VOLTAGE
(HORIZONTAL SCANNING DRIVING SIGNAL)

SECOND VOLTAGE
(VERTICAL SCANNING DRIVING SIGNAL)

OPTICAL DEVICE, OPTICAL SCANNER, AND IMAGE DISPLAY APPARATUS

BACKGROUND

1. Technical Field

The present invention relates to an optical device, an optical scanner, and an image display apparatus.

2. Related Art

For example, an optical scanner that two-dimensionally scans light is known as an optical device used in a projector or the like (see, for example, JP-A-2009-75587 (Patent Literature 1)).

The optical scanner disclosed in Patent Literature 1 includes a frame, an outer driving section suspended on the frame via a first torsional spring and capable of turning about a first axis, an inner driving section suspended on the outer driving section via a second torsional spring and capable of turning about a second axis orthogonal to the first axis, and a stage arranged on an upper part of the inner driving section and configured to turn together with the inner driving section.

In the optical scanner disclosed in Patent Literature 1, the outer driving section is turned about the first axis and the inner driving section is turned about the second axis by a Lorentz force generated by an electric current flowing to a coil provided in each of the inner driving section and the outer driving section and a magnetic field between a pair of magnets arranged on both sides of the frame.

The stage is coupled to the inner driving section through a link section projecting from the center of a lower part of the stage. The center of gravity of the stage is located on the second axis in plan view. Therefore, inertial moments about the second axis in portions on one side and on the other side of the stage with respect to the second axis are equal.

In this way, in the optical scanner disclosed in Patent Literature 1, it is difficult to excite the inner driving section about the second axis. Therefore, a build-up time is long. The build-up time means time in which a light reflection plate changes from a stop state to a desired swinging state.

SUMMARY

An advantage of some aspects of the invention is to provide an optical device, an optical scanner, and an image display apparatus that can reduce a build-up time.

An aspect of the invention is directed to an optical device including: a movable section capable of swinging about a first axis; a frame body section capable of swinging about a second axis crossing the first axis; a first shaft section configured to connect the movable section and the frame body section; and a light reflection plate fixed to the movable section and provided with a light reflecting section having light reflectivity. In plan view from the thickness direction of the light reflection plate, the center of gravity of the light reflection plate is shifted from the first axis.

With the optical device, it is possible to vary inertial moments about the first axis in portions on one side and on the other side of the light reflection plate with respect to the first axis in plan view. Therefore, it is possible to easily excite the light reflection plate about the first axis. As a result, it is possible to reduce a build-up time (time in which the light reflection plate changes from a stop state to a desired swinging state).

In the optical device of the aspect of the invention, it is preferable that the light reflection plate is formed in a shape asymmetrical with respect to the first axis in the plan view.

With this configuration, even if the thickness of the light reflection plate is fixed or the light reflection plate is made of a single material, it is possible to shift the center of gravity of the light reflection plate from the first axis in plan view.

In the optical device of the aspect of the invention, it is preferable that the light reflection plate is formed in a shape symmetrical with respect to the second axis in the plan view.

With this configuration, it is possible to suppress or prevent unintended occurrence of a vibration mode of the light reflection plate.

In the optical device of the aspect of the invention, it is preferable that the frame body section is formed in a shape symmetrical with respect to each of the first axis and the second axis in the plan view.

With this configuration, it is possible to suppress or prevent unintended occurrence of the vibration mode of the light reflection plate.

In the optical device of the aspect of the invention, it is preferable that the optical device further includes a first distortion detection element arranged in the first shaft section and configured to detect deformation of the first shaft section, and the light reflection plate covers the first distortion detecting element in the plan view.

With this configuration, it is possible to prevent deterioration in detection accuracy of the first distortion detecting element caused when light that cannot be made incident on the light reflecting section is made incident on the first distortion detecting element.

In the optical device of the aspect of the invention, it is preferable that the optical device further includes: a fixed section; a second shaft section configured to connect the frame body section and the fixed section; and a second distortion detection element arranged in the second shaft section and configured to detect deformation of the second shaft section, and the light reflection plate covers the second distortion detecting element in the plan view.

With this configuration, it is possible to prevent deterioration in detection accuracy of the second distortion detecting element caused when light that cannot be made incident on the light reflecting section is made incident on the second distortion detecting element.

In the optical device of the aspect of the invention, it is preferable that the optical device further includes: a permanent magnet arranged in the frame body section; a coil arranged to be opposed to the frame body section; and a voltage applying section configured to apply a voltage to the coil, and the voltage applying section applies the voltage to the coil to thereby swing the movable section about the first axis and the second axis.

With this configuration, it is possible to swing the light reflection plate about the first axis and the second axis with an electromagnetic driving system (a moving magnet system) while attaining a reduction in the size of the optical device. Since the coil is separated from a vibration system of the optical device, it is possible to prevent an adverse effect due to heat generation of the coil.

In the optical device of the aspect of the invention, it is preferable that the optical device further includes: a coil arranged in the frame body section; a permanent magnet configured to generate a magnetic field acting on the coil; and a voltage applying section configure to apply a voltage to the coil, and the voltage applying section applies the voltage to the coil to thereby swing the movable section about the first axis and the second axis.

With this configuration, it is possible to swing the light reflection plate about the first axis and the second axis with an electromagnetic driving system (a moving coil system) while attaining a reduction in the size of the optical device.

In the optical device of the aspect of the invention, it is preferable that the optical device further includes: a piezoelectric element provided in the second shaft section; and a voltage applying section configured to apply a voltage to the piezoelectric element, and the voltage applying section applies the voltage to the piezoelectric element to thereby swing the movable section about the first axis and the second axis.

With this configuration, it is possible to swing the light reflection plate about the first axis and the second axis with the electromagnetic driving system while attaining a reduction in the size of the optical device.

In the optical device of the aspect of the invention, it is preferable that the voltage applying section includes: a first voltage generating section configured to generate a first voltage having a first frequency; a second voltage generating section configured to generate a second voltage having a second frequency different from the first frequency; and a voltage superimposing section configured to superimpose the first voltage and the second voltage, and the voltage applying section swings the movable section about the first axis at the first frequency and swings the movable section about the second axis at the second frequency.

With this configuration, it is possible to excite, without directly applying a driving force to the movable section and the light reflection plate, vibration having a vibration component about the first axis of the frame body section and swing the light reflection plate about the first axis according to the vibration. Therefore, it is possible to reduce the number of components configuring a driving source. As a result, it is possible to attain a reduction in the size and a reduction in costs of the optical device. In swinging the light reflection plate about the first axis without directly applying a driving force to the light reflection plate in this way, the effect of making it easy to excite the light reflection plate about the first axis is made conspicuous by varying inertial moments about the first axis in portions on one side and on the other side of the light reflection plate with respect to the first axis in plan view.

In the optical device of the aspect of the invention, it is preferable that the optical device further includes a spacer configured to couple the movable section and the light reflection plate, and the light reflection plate is separated from the movable section in the thickness direction of the light reflection plate.

With this configuration, it is possible to separate the light reflection plate from the movable section in the thickness direction of the light reflection plate relatively easily and at highly accurate dimension accuracy. Therefore, it is possible to suppress the light reflection plate from interfering with the frame body section and the supporting section even if the light reflection plate sings.

In the optical device of the aspect of the invention, it is preferable that the center of gravity of the light reflection plate and the spacer do not overlap in plan view from the thickness direction of the light reflection plate.

With this configuration, it is possible to vary inertial moments about the first axis in portions on one side and on the other side of the light reflection plate with respect to the first axis in plan view.

Another aspect of the invention is directed to an optical scanner including: a movable section capable of swinging about a first axis; a frame body section capable of swinging about a second axis crossing the first axis; a first shaft section configured to connect the movable section and the frame body section; and a light reflection plate fixed to the movable section and provided with a light reflecting section having light reflectivity. In plan view from the thickness direction of the light reflection plate, the center of gravity of the light reflection plate is shifted from the first axis.

With the optical scanner, it is possible to reduce a build-up time while attaining a reduction in the size of the optical scanner.

Still another aspect of the invention is directed to an image display apparatus including: a movable section capable of swinging about a first axis; a frame body section capable of swinging about a second axis crossing the first axis; a first shaft section configured to connect the movable section and the frame body section; and a light reflection plate fixed to the movable section and provided with a light reflecting section having light reflectivity. In plan view from the thickness direction of the light reflection plate, the center of gravity of the light reflection plate is shifted from the first axis.

With the image display apparatus, it is possible to reduce a build-up time while attaining a reduction in the size of the image display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained below with reference to the accompanying drawings. Note that, in the embodiments explained below, an optical device is applied to an optical scanner.

First Embodiment

Figure 1:
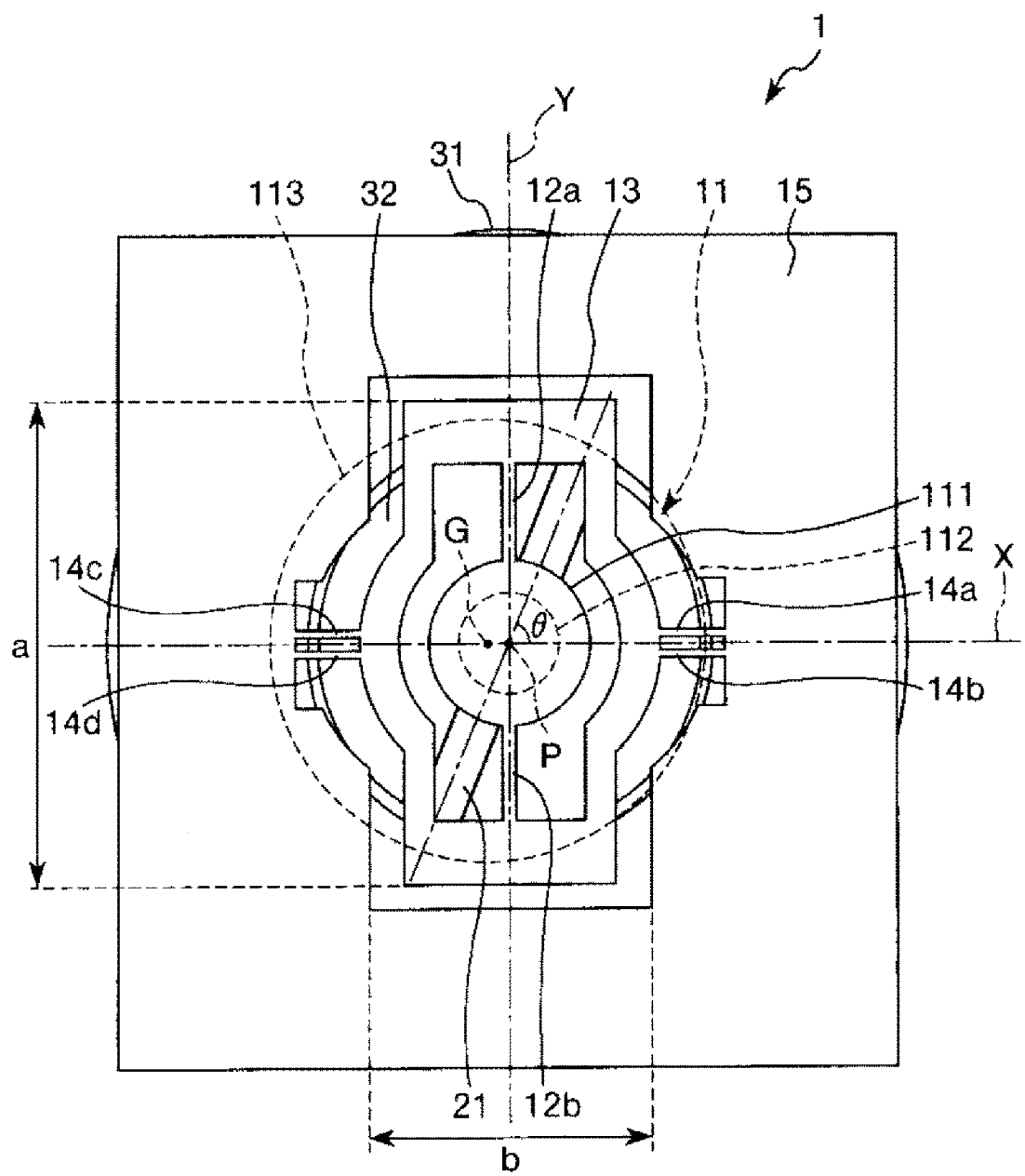
FIG. 1 is a plan view showing an optical scanner (an optical device) according to a first embodiment of the invention.
Figure 2:
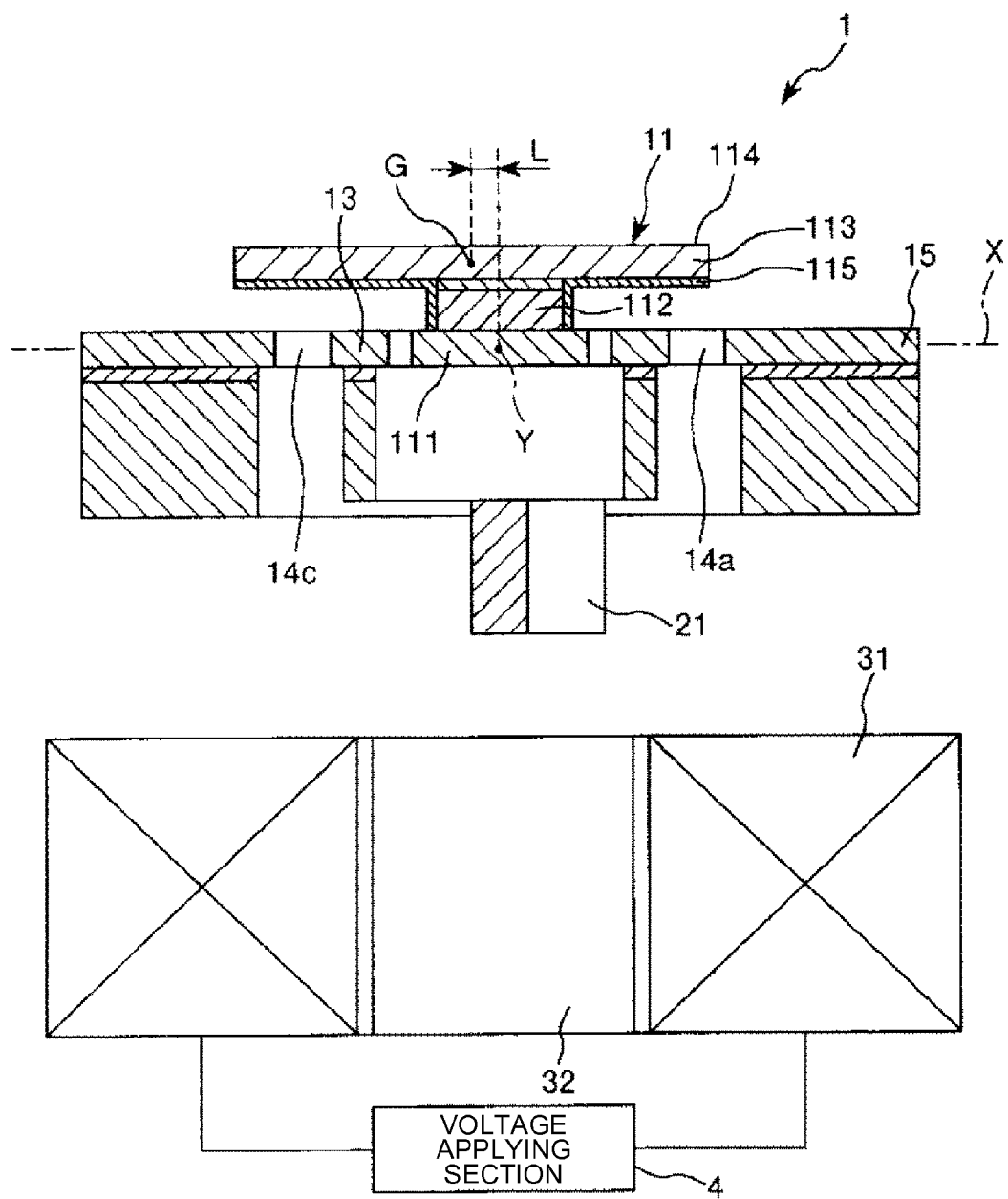
FIG. 2 is a sectional view (a sectional view taken along an X axis) of the optical scanner shown in FIG. 1.
Figure 3:
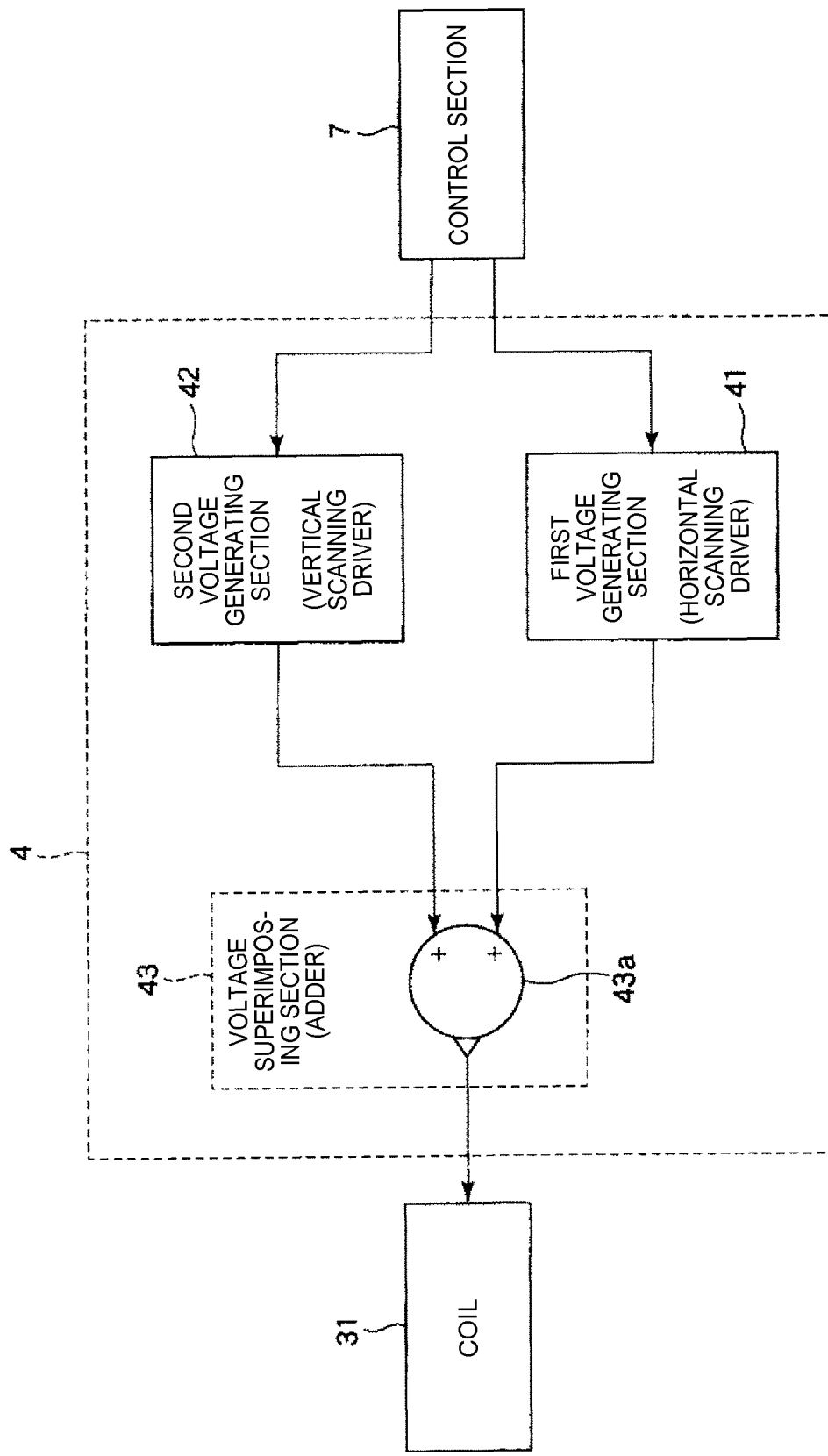
FIG. 3 is a block diagram for explaining a voltage applying section of a driving section included in the optical scanner shown in FIG. 1.
Figure 4A:
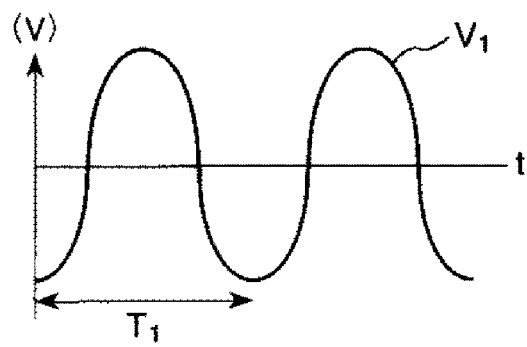
FIGS. 4A and 4B are diagrams showing examples of generated voltages in a first voltage generating section and a second voltage generating section shown in FIG. 3.
Figure 4B:
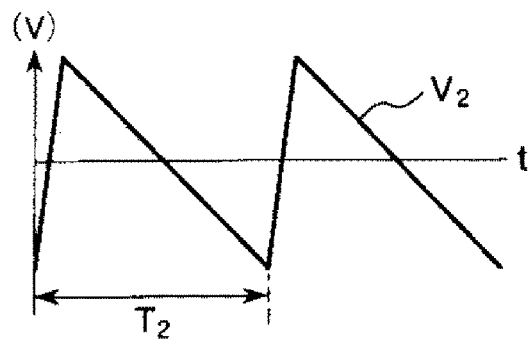
Figure 5:
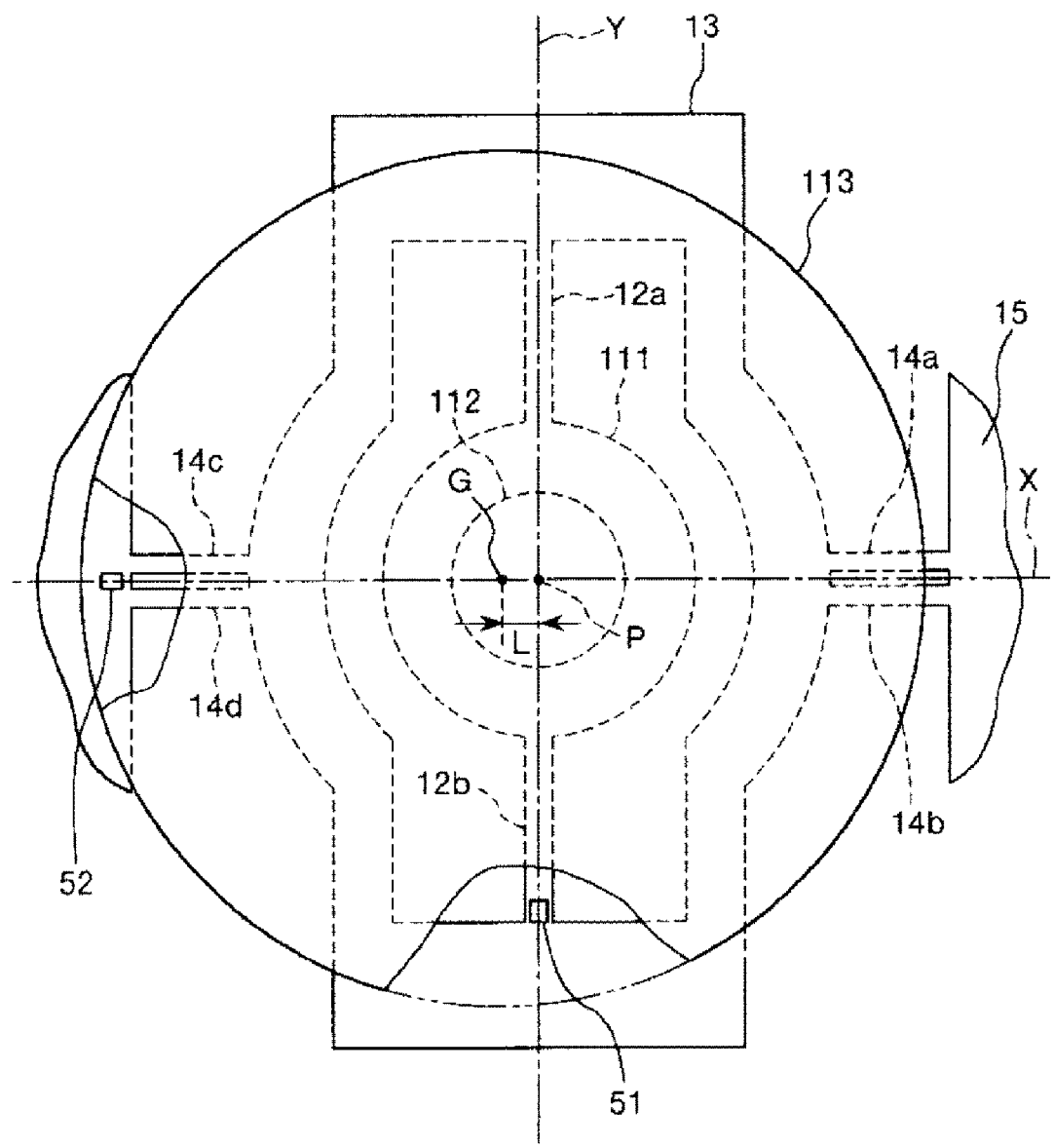
FIG. 5 is a plan view for explaining a light reflection plate included in the optical scanner shown in FIG. 1.

FIG. 1 is a plan view showing an optical scanner (an optical device) according to a first embodiment of the invention. FIG. 2 is a sectional view (a sectional view taken along an X axis) of the optical scanner shown in FIG. 1. FIG. 3 is a block diagram for explaining a voltage applying section of a driving section included in the optical scanner shown in FIG. 1. FIGS. 4A and 4B are diagrams showing examples of generated voltages in a first voltage generating section and a second voltage generating section shown in FIG. 3. FIG. 5 is a plan view for explaining a light reflection plate included in the optical scanner shown in FIG. 1.

In the following explanation, for convenience of the explanation, the upper side in FIG. 2 is referred to as "upper" and the lower side in FIG. 2 is referred to as "lower".

As shown in FIGS. 1 and 2, an optical scanner 1 includes a movable mirror section 11, a pair of shaft sections 12a and 12b (first shaft sections), a frame body section 13, two pairs of shaft sections 14a, 14b, 14c, and 14d (second shaft sections), a supporting section 15, a permanent magnet 21, a coil 31, a magnetic core 32, a voltage applying section 4, a distortion detecting element 51 (a first distortion detecting element), and a distortion detecting element 52 (a second distortion detecting element).

The movable mirror section 11 and the pair of shaft sections 12a and 12b configure a first vibration system that swings (reciprocatingly turns) about a Y axis (a first axis). The movable mirror section 11, the pair of shaft sections 12a and 12b, the frame body section 13, the two pairs of shaft sections 14a, 14b, 14c, and 14d, and the permanent magnet 21 configure a second vibration system that swings (reciprocatingly turns) about the X axis (a second axis).

The permanent magnet 21, the coil 31, and the voltage applying section 4 configure a driving section that drives the first vibration system and the second vibration system (i.e., swings the movable mirror section 11 about the X axis and the Y axis).

The sections of the optical scanner 1 are explained in detail below in order.

The movable mirror section 11 includes a base (a movable section) 111 and a light reflection plate 113 fixed to the base 111 via a spacer 112.

A light reflecting section 114 having light reflectivity is provided on the upper surface (one surface) of the light reflecting plate 113.

The light reflection plate 113 is separated from the shaft sections 12a and 12b in the thickness direction of the light reflection plate 113 and provided to overlap the shaft sections 12a and 12b when viewed from the thickness direction of the light reflection plate 113 (hereinafter also referred to as "plan view").

Therefore, it is possible to increase the area of the surface of the light reflection plate 113 while reducing the distance between the shaft section 12a and the shaft section 12b. Since it is possible to reduce the distance between the shaft section 12a and the shaft section 12b, it is possible to attain a reduction in the size of the frame body section 13. Further, since it is possible to attain the reduction in the size of the frame body section 13, it is possible to reduce the distance between the shaft sections 14a and 14b and the shaft sections 14c and 14d.

Therefore, even if the area of the surface of the light reflection plate 113 is increased, it is possible to attain a reduction in the size of the optical scanner 1.

The light reflection plate 113 is formed to cover the entire shaft sections 12a and 12b in plan view. In other words, the shaft sections 12a and 12b are located on the inner side of the outer circumference of the light reflection plate 113 in plan view. Consequently, the area of the light reflection plate 113 increases. As a result, it is possible to increase the area of the light reflecting section 114. Further, it is possible to prevent unnecessary light (e.g., light that cannot be made incident on the light reflecting section 114) from being reflected on the shaft sections 12a and 12b to change to stray light.

In this embodiment, the light reflection plate 113 is formed in a circular shape in plan view. Consequently, it is possible to efficiently use the light reflecting section 114 to reflect light. The plan view shape of the light reflection plate 113 is not limited to this and may be, for example, an elliptical shape and polygonal shapes such as a square shape.

A rigid layer 115 is provided on the lower surface (the other surface; a surface on the base 111 side) of the light reflection plate 113.

The rigid layer 115 is made of a material more rigid than the material of a main body of the light reflection plate 113. Consequently, it is possible to increase the rigidity of the light reflection plate 113. Therefore, it is possible to prevent or suppress a bend during the swing of the light reflection plate 113. Further, it is possible to reduce the thickness of the light reflection plate 113 and suppress inertial moments during the swing about the X axis and the Y axis of the light reflection plate 113.

The material of the rigid layer 115 is not particularly limited as long as the material is more rigid than the material of the main body of the light reflection plate 113. For example, diamond, quartz, sapphire, lithium tantalate, potassium niobate, and a carbon nitride film can be used. In particular, it is preferable to use diamond.

The (average) thickness of the rigid layer 115 is not particularly limited. However, the thickness is preferably about 1 to 10 μm and more preferably about 1 to 5 μm.

The rigid layer 115 may be formed by a single layer or may be formed by a laminated body of a plurality of layers. The rigid layer 115 may be provided over the entire lower surface of the light reflection plate 113 or may be provided in apart of the lower surface. The rigid layer 115 is provided according to necessity and can be omitted.

For the formation of the rigid layer 115, for example, chemical vapor deposition (CVD) such as plasma CVD, thermal CVD, and laser CV, vacuum vapor deposition, sputtering, dry plating such as ion plating, wet plating such as electrolytic plating, immersion plating, and electroless plating, thermal spraying, and joining of sheet-like members can be used.

The lower surface of the light reflection plate 113 is fixed to the base 111 via the spacer 112.

The spacer 112 couples the base 111 and the light reflection plate 113 and separates the light reflection plate 113 from the base 111 in the thickness direction of the light reflection plate 113. Consequently, it is possible to separate the light reflection plate 113 from the base 111 in the thickness direction of the light reflection plate 113 relatively easily and at highly accurate dimension accuracy. Further, it is possible to swing the light reflection plate 113 about the Y axis while preventing contact of the shaft sections 12a and 12b, the frame body section 13, and the shaft sections 14a, 14b, 14c, and 14d.

In plan view, the center of gravity G of the light reflection plate 113 is arranged to be shifted from the Y axis. Consequently, it is possible to easily excite the light reflection plate 113 about the Y axis. The arrangement of the light reflection plate 113 and the action by the arrangement are explained below in detail.

The base 111 is located on the inner side of the outer circumference of the light reflection plate 113 in plan view. The area in plan view of the base 111 is preferably as small as possible as long as the base 111 can support the light reflection plate 113 via the spacer 112. Consequently, it is possible to reduce the distance between the shaft section 12a and the shaft section 12b while increasing the area of the surface of the light reflection plate 113.

The frame body section 13 is formed in a frame shape and provided to surround the base 111 of the movable mirror section 11. In other words, the base 111 of the movable mirror section 11 is provided on the inner side of the frame body section 13 formed in a frame shape.

The frame body section 13 is supported by the supporting section 15 via the shaft sections 14a, 14b, 14c, and 14d. The base 111 of the movable mirror section 11 is supported by the frame body section 13 via the shaft sections 12a and 12b.

The length of the frame body section 13 in a direction along the Y axis is larger than the length of the frame body section 13 in a direction along the X axis. That is, when the length of the frame body section 13 in the direction along the Y axis is represented as "a" and the length of the frame body section 13 in the direction along the X axis is represented as "b", a relation a>b is satisfied. Consequently, it is possible to reduce the length of the optical scanner 1 in the direction along the X axis while securing length necessary for the shaft sections 12a and 12b.

The frame body section 13 is formed in a shape along the external shape of a structure formed by the base 111 of the movable mirror section 11 and the pair of shaft sections 12a and 12b in plan view. Consequently, it is possible to attain a reduction in the size of the frame body section 13 while allowing the swing of the first vibration system configured by the movable mirror section 11 and the pair of shaft sections 12a and 12b, that is, the swing about the Y axis of the movable mirror section 11.

The shape of the frame body section 13 is not limited to the shape shown in the figure as long as the shape is a frame shape.

Each of the shaft sections 12a and 12b and the shaft sections 14a, 14b, 14c, and 14d is elastically deformable.

The shaft sections 12a and 12b couple the movable mirror section 11 and the frame body section 13 to enable the movable mirror section 11 to swing (turn) about the Y axis (the first axis). The shaft sections 14a, 14b, 14c, and 14d couple the frame body section 13 and the supporting section 15 to enable the frame body section 13 to swing (turn) about the X axis (the second axis) orthogonal to the Y axis.

The shaft sections 12a and 12b are arranged to be opposed to each other via the base 111 of the movable mirror section 11. Each of the shaft sections 12a and 12b is formed in a longitudinal shape extending in the direction along the Y axis. One end portion of each of the shaft sections 12a and 12b is connected to the base 111 and the other end portion is connected to the frame body section 13. Each of the shaft sections 12a and 12b is arranged such that the center axis thereof coincides with the Y axis.

Each of the shaft sections 12a and 12b is torsionally deformed according to the swing about the Y axis of the movable mirror section 11.

The shaft sections 14a and 14b and the shaft sections 14c and 14d are arranged to be opposed to each other via the frame body section 13. Each of the shaft sections 14a, 14b, 14c, and 14d is formed in a longitudinal shape extending in the direction along the X axis. One end portion of each of the shaft sections 14a, 14b, 14c, and 14d is connected to the frame body section 13 and the other end is connected to the supporting section 15. The shaft sections 14a and 14b are arranged to be opposed to each other via the X axis. Similarly, the shaft sections 14c and 14d are arranged to be opposed to each other via the X axis.

Each of the entire shaft sections 14a and 14b and the entire shaft sections 14c and 14d is torsionally deformed according to the swing about the X axis of the frame body section 13.

As explained above, the movable mirror section 11 is enabled to swing about the Y axis and the frame body section 13 is enabled to swing about the X axis. Consequently, it is possible to swing (turn) the movable mirror section 11 (in other words, the light reflection plate 113) about the two axes, i.e., the X axis and the Y axis orthogonal to each other.

The shape of each of the shaft sections 12a and 12b and the shaft sections 14a, 14b, 14c, and 14d is not limited to the shape explained above. For example, each of the shaft sections 12a and 12b and the shaft sections 14a, 14b, 14c, and 14d may include a bent or curved portion or a branching portion in at least a halfway place.

The base 111, the shaft sections 12a and 12b, the frame body section 13, the shaft sections 14a, 14b, 14c, and 14d, and the supporting section 15 are integrally formed.

In this embodiment, the base 111, the shaft sections 12a and 12b, the frame body section 13, the shaft sections 14a, 14b, 14c, and 14d, and the supporting section 15 are formed by etching an SOI substrate formed by laminating a first Si layer (a device layer), a $SiO_2$ layer (a box layer), and a second Si layer (a handle layer) in this order. Consequently, it is possible to improve vibration characteristics of the first vibration system and the second vibration system. The SOI substrate can be subjected to fine machining by the etching. Therefore, by forming the base 111, the shaft sections 12a and 12b, the frame body section 13, the shaft sections 14a, 14b, 14c, and 14d, and the supporting section 15 using the SOI substrate, it is possible to improve dimension accuracy of these sections. Further, it is possible to attain a reduction in the size of the optical scanner 1.

Each of the base 111, the shaft sections 12a and 12b, and the shaft sections 14a, 14b, 14c, and 14d is configured by the first Si layer of the SOI substrate. Consequently, it is possible to improve the elasticity of the shaft sections 12a and 12b and the shaft sections 14a, 14b, 14c, and 14d. Further, it is possible to prevent the base 111 from coming into contact with the frame body section 13 when the base 111 turns about the Y axis.

Each of the frame body section 13 and the supporting section 15 is configured by a laminated body formed by the first Si layer, the SiO₂ layer, and the second Si layer of the SOI substrate. Consequently, it is possible to improve the rigidity of the frame body section 13 and the supporting section 15. The SiO₂ layer and the second Si layer of the frame body section 13 have not only a function of a rib for improving the rigidity of the frame body section 13 but also a function of preventing the movable mirror section 11 from coming into contact with the permanent magnet 21.

It is preferable that reflection prevention treatment is applied to the upper surfaces of the first shaft section, the second shaft section, the frame body section 13, and the supporting section 15 located on the outer side of the light reflection plate 113. Consequently, it is possible to prevent unnecessary light irradiated on sections other than the light reflection plate 113 from changing to stray light.

The reflection prevention treatment is not particularly limited. Examples of the reflection prevention treatment include formation of a reflection preventing film (a dielectric multilayer film), roughening treatment, and blackening treatment.

The material and the formation method of the base 111, the shaft sections 12a and 12b, and the shaft sections 14a, 14b, 14c, and 14d explained above are examples. The invention is not limited to the shape and the formation method.

In this embodiment, the spacer 112 and the light reflection plate 113 are also formed by etching the SOI substrate. The spacer 112 is configured by a laminated body formed by the SiO₂ layer and the second Si layer of the SOI substrate. The light reflection plate 113 is configured by the first Si layer of the SOI substrate.

As explained above, the spacer 112 and the light reflection plate 113 are formed using the SOI substrate. Consequently, it is possible to easily and highly accurately manufacture the spacer 112 and the light reflection plate 113, which are joined to each other.

The spacer 112 is joined to the base 111 by, for example, a joining material (not shown in the figure) such as an adhesive or a brazing material.

The permanent magnet 21 is joined to the lower surface (a surface on the opposite side of the light reflection plate 113) of the frame body section 13.

A method of joining the permanent magnet 21 and the frame body section 13 is not particularly limited. For example, a method of joining the permanent magnet 21 and the frame body section 13 using an adhesive can be used.

The permanent magnet 21 is magnetized in a direction inclining with respect to the X axis and the Y axis in plan view.

In this embodiment, the permanent magnet 21 is formed in a longitudinal shape (a bar shape) extending in the direction inclining with respect to the X axis and the Y axis. The permanent magnet 21 is magnetized in the longitudinal direction. That is, the permanent magnet 21 is magnetized to form one end portion as an S pole and form the other end portion as an N pole.

The permanent magnet 21 is provided to be symmetrical with respect to an intersection of the X axis and the Y axis in plan view.

In an example explained in this embodiment, one permanent magnet is set in the frame body section 13. However, the number of permanent magnets is not limited to one. For example, two permanent magnets may be set in the frame body section 13. In this case, for example, the two permanent magnets formed in a long shape only have to be set in the frame body section 13 to be opposed to each other via the base 111 in plan view and parallel to each other.

An inclination angle θ in the direction of the magnetization (the extending direction) of the permanent magnet 21 with respect to the X axis is not particularly limited. However, the inclination angle θ is preferably equal to or larger than 30° and equal to or smaller than 60°, more preferably equal to or larger than 45° and equal to or smaller than 60°, and still more preferably 45°. By providing the permanent magnet 21 in this way, it is possible to smoothly and surely turn the movable mirror section 11 about the X axis.

On the other hand, when the inclination angle θ is smaller than 30° (a lower limit value), depending on conditions such as the magnitude of a voltage applied to the coil 31 by the voltage applying section 4, the movable mirror section 11 cannot be sufficiently turned about the X axis. On the other hand, when the inclination angel θ exceeds 60° (an upper limit value), depending on the conditions, the movable mirror section 11 cannot be sufficiently turned about the Y axis.

As the permanent magnet 21, for example, a neodymium magnet, a ferrite magnet, a samarium cobalt magnet, an alnico magnet, and a bond magnet can be suitably used. The permanent magnet 21 is obtained by magnetizing a hard magnetic body. For example, the permanent magnet 21 is formed by, after setting the hard magnetic body before magnetization in the frame body section 13, magnetizing the hard magnetic body. This is because, when it is attempted to set the permanent magnet 21, which is already magnetized, in the frame body section 13, the permanent magnet 21 sometimes cannot be set in a desired position because of the influence of the outside and magnetic fields of other components.

The coil 31 is provided right under the permanent magnet 21. That is, the coil 31 is provided to be opposed to the lower surface of the frame body section 13. Consequently, it is possible to cause a magnetic field generated from the coil 31 to efficiently act on the permanent magnet 21. Consequently, it is possible to attain power saving and a reduction in the size of the optical scanner 1.

In this embodiment, the coil 31 is provided to be wound around the magnetic core 32. Consequently, it is possible to cause the magnetic field generated from the coil 31 to efficiently act on the permanent magnet 21. The magnetic core 32 may be omitted.

The coil 31 is electrically connected to the voltage applying section 4.

When a voltage is applied to the coil 31 by the voltage applying section 4, magnetic fields having magnetic fluxes orthogonal to the X axis and the Y axis are generated from the coil 31.

The voltage applying section 4 includes, as shown in FIG. 3, a first voltage generating section 41 configured to generate a first voltage $V_1$ for turning the movable mirror section 11 about the Y axis, a second voltage generating section 42 configured to generate a second voltage $V_2$ for turning the movable mirror section 11 about the X axis, and a voltage superimposing section 43 configured to superimpose the first voltage $V_1$ and the second voltage $V_2$. The voltage applying section 4 applies a voltage superimposed by the voltage superimposing section 43 to the coil 31.

The first voltage generating section 41, as shown in FIG. 4A, generates the first voltage $V_1$ (a voltage for horizontal scanning) that cyclically changes at a cycle $T_1$. That is, the first voltage generating section 41 generates the first voltage $V_1$ having a first frequency ($1/T_1$).

The first voltage $V_1$ has a waveform like a sine wave. Therefore, the optical scanner 1 can effectively main-scan light. The waveform of the first voltage $V_1$ is not limited to this waveform.

The first frequency $(1/T_1)$ is not particularly limited as long as the first frequency $(1/T_1)$ is a frequency suitable for the horizontal scanning. However, the first frequency $(1/T_1)$ is preferably 10 to 40 kHz.

In this embodiment, the first frequency is set to be equal to a torsional resonance frequency (f1) of the first vibration system (a torsional vibration system) configured by the movable mirror section 11 and the pair of shaft sections 12a and 12b. That is, the first vibration system is designed (manufactured) to set the torsional resonance frequency f1 to a frequency suitable for the horizontal scanning. Consequently, it is possible to increase a turning angle about the Y axis of the movable mirror section 11.

On the other hand, the second voltage generating section 42, as shown in FIG. 4B, generates the second voltage $V_2$ (a voltage for vertical scanning) that cyclically changes at a cycle $T_2$ different from the cycle $T_1$. That is, the second voltage generating section 42 generates the second voltage $V_2$ having a second frequency $(1/T_2)$.

The second voltage $V_2$ has a waveform like a saw-tooth wave. Therefore, the optical scanner 1 can effectively perform vertical scanning (sub-scanning) of light. The waveform of the second voltage $V_2$ is not limited to this waveform.

The second frequency $(1/T_2)$ is not particularly limited as long as the second frequency $(1/T_2)$ is different from the first frequency $(1/T_1)$ and suitable for the vertical scanning. However, the second frequency $(1/T_2)$ is preferably 30 to 120 Hz (about 60 Hz). By setting the frequency of the second voltage $V_2$ to about 60 Hz in this way and setting the frequency of the first voltage $V_1$ to 10 to 40 kHz as explained above, it is possible to turn, at a frequency suitable for rendering on a display, the movable mirror section 11 about each of the two axes (the X axis and the Y axis) orthogonal to each other. However, a combination of the frequency of the first voltage $V_1$ and the frequency of the second voltage $V_2$ is not particularly limited as long as the movable mirror section 11 can be turned about each of the X axis and the Y axis.

In this embodiment, the frequency of the second voltage $V_2$ is adjusted to be a frequency different from a torsional resonance frequency (a resonance frequency) of the second vibration system (a torsional vibration system) configured by the movable mirror section 11, the pair of shaft sections 12a and 12b, the frame body section 13, the two pairs of shaft sections 14a, 14b, 14c, and 14d, and the permanent magnet 21.

The frequency (the second frequency) of the second voltage $V_2$ is preferably smaller than the frequency (the first frequency) of the first voltage $V_1$. That is, the cycle $T_2$ is preferably longer than the cycle $T_1$. Consequently, it is possible to more surely and smoothly turn the movable mirror section 11 about the X axis at the second frequency while turning the movable mirror section 11 about the Y axis at the first frequency.

When the torsional resonance frequency of the first vibration system is represented as f1 [Hz] and the torsional resonance frequency of the second vibration system is represented as f2 [Hz], f1 and f2 preferably satisfy a relation f2<f1 and more preferably satisfy a relation f1≥10f2. Consequently, it is possible to more smoothly turn the movable mirror section 11 about the X axis at the frequency of the second voltage $V_2$ while turning the movable mirror section 11 about the Y axis at the frequency of the first voltage $V_1$. On the other hand, when a relation between f1 and f2 is f1≤f2, it is likely that vibration of the first vibration system due to the second frequency is likely to occur.

Each of the first voltage generating section 41 and the second voltage generating section 42 is connected to a control section 7 and driven on the basis of a signal output from the control section 7. The voltage superimposing section 43 is connected to the first voltage generating section 41 and the second voltage generating section 42.

The voltage superimposing section 43 includes an adder 43a for applying a voltage to the coil 31. The adder 43a is configured to receive the first voltage $V_1$ from the first voltage generating section 41, receive the second voltage $V_2$ from the second voltage generating section 42, superimpose the voltages, and apply a superimposed voltage to the coil 31.

A driving method for the optical scanner 1 is explained. In this embodiment, as explained above, the frequency of the first voltage $V_1$ is set to be equal to the torsional resonance frequency of the first vibration system. The frequency of the second voltage $V_2$ is set to a value different from the torsional resonance frequency of the second vibration system and set to be smaller than the frequency of the first voltage $V_1$ (e.g., the frequency of the first voltage $V_1$ is set to 18 kHz and the frequency of the second voltage $V_2$ is set to 60 Hz).

For example, the first voltage $V_1$ shown in FIG. 4A and the second voltage $V_2$ shown in FIG. 4B are superimposed by the voltage superimposing section 43. A superimposed voltage is applied to the coil 31.

Then, a magnetic field for attracting one end portion (the N pole) of the permanent magnet 21 to the coil 31 and separating the other end portion (the S pole) of the permanent magnet 21 from the coil 31 (this magnetic field is referred to as "magnetic field A1") and a magnetic field for separating the one end portion (the N pole) of the permanent magnet 21 from the coil 31 and attracting the other end portion (the S pole) of the permanent magnet 21 to the coil 31 (this magnetic field is referred to as "magnetic field A2") are alternately switched by the first voltage $V_1$.

As explained above, the permanent magnet 21 is arranged such that the respective end portions (magnetic poles) of the permanent magnet 21 are located in two regions divided by the Y axis. That is, in plan view of FIG. 1, the N pole of the permanent magnet 21 is located on one side and the S pole of the permanent magnet 21 is located on the other side across the Y axis. Therefore, when the magnetic field A1 and the magnetic field A2 are alternately switched, vibration having a vibration component about the Y axis is excited in the frame body section 13. According to the vibration, the movable mirror section 11 turns about the Y axis at the frequency of the first voltage $V_1$ while torsionally deforming the shaft sections 12a and 12b.

The frequency of the first voltage $V_1$ is equal to the torsional resonance frequency of the first vibration system. Therefore, it is possible to efficiently turn the movable mirror section 11 about the Y axis with the first voltage V1. That is, even if the vibration having the vibration component about Y axis of the frame body section 13 is small, it is possible to increase a turning angle about the Y axis of the movable mirror section 11 involved the vibration.

On the other hand, a magnetic field for attracting the one end portion (the N pole) of the permanent magnet 21 to the coil 31 and separating the other end portion (the S pole) of the permanent magnet 21 from the coil 31 (this magnetic field is referred to as "magnetic field B1") and a magnetic field for separating the one end portion (the N pole) of the permanent magnet 21 from the coil 31 and attracting the other end portion (the S pole) of the permanent magnet 21 to the coil 31 (this magnetic field is referred to as "magnetic field B2") are alternately switched by the second voltage $V_2$.

As explained above, the permanent magnet 21 is arranged such that the respective end portions (magnetic poles) are arranged in two regions divided by the X axis. That is, in plan view of FIG. 1, the N pole of the permanent magnet 21 is located on one side and the S pole of the permanent magnet 21 is located on the other side across the X axis. Therefore, when the magnetic field B1 and the magnetic field B2 are alternately switched, the frame body section 13 turns about the X axis at the frequency of the second voltage $V_2$ together with the movable mirror section 11 while torsionally deforming each of the shaft sections 14a and 14b and the shaft sections 14c and 14d.

The frequency of the second voltage $V_2$ is set extremely low compared with the frequency of the first voltage $V_1$. The torsional resonance frequency of the second vibration system is designed lower than the torsional resonance frequency of the first vibration system. Therefore, it is possible to prevent the movable mirror section 11 from being turned about the Y axis at the frequency of the second voltage $V_2$.

As explained above, by applying the voltage obtained by superimposing the first voltage $V_1$ and the second voltage $V_2$ to the coil 31, it is possible to turn the movable mirror section 11 about the X axis at the frequency of the second voltage $V_2$ while turning the movable mirror section 11 about the Y axis at the frequency of the first voltage $V_1$. Consequently, it is possible to attain a reduction costs and a reduction in the size of the apparatus and turn the movable mirror section 11 about each of the X axis and the Y axis with an electromagnetic driving system (a moving magnet system). In particular, it is possible to excite vibration having a vibration component about the Y axis of the frame body section 13 without directly applying a driving force to the base 111 and the light reflection plate 113 and swing the light reflection plate 113 about the Y axis according to the vibration. Therefore, it is possible to reduce the number of components (permanent magnets and coils) configuring a driving source compared with providing driving sources respectively in the base 111 and the frame body section 13. Therefore, it is possible to attain a simple and small configuration. Since the coil 31 is separated from the vibration system of the optical scanner 1, it is possible to prevent an adverse effect on the vibration system due to heat generation of the coil 31.

The behavior of the movable mirror section 11 is detected on the basis of detection signals of the distortion detecting elements 51 and 52.

The distortion detecting element 51 (the first distortion detecting element) detects deformation (mainly a torsional deformation) of the shaft section 12b. A detection signal of the distortion detecting element 51 includes a signal based on the torsional deformation of the shaft section 12b. Therefore, it is possible to detect the behavior about the Y axis of the movable mirror section 11 on the basis of the detection signal of the distortion detecting element 51.

In this embodiment, the distortion detecting element 51 is arranged at an end portion on the frame body section 13 side of the shaft section 12b. Consequently, it is possible to reduce portions of a wire, which is connected to the distortion detecting element 51, arranged in the shaft section 12b and prevent disconnection of the wire.

On the other hand, the distortion detecting element (the second distortion detecting element) detects deformation (mainly bending deformation) of the shaft section 14d. A detection signal of the distortion detecting element 52 includes a signal based on torsional deformation of the entire shaft sections 14c and 14d. Therefore, it is possible to detect the behavior about the X axis of the movable mirror section 11 and the frame body section 13 on the basis of the detection signal of the distortion detecting element 52.

In this embodiment, the distortion detecting element 52 is arranged near a boundary section between the supporting section 15 and the shaft sections 14c and 14d. Consequently, it is possible to reduce or dispense with portions of a wire, which is connected to the distortion detecting element 52, arranged in the shaft sections 14c and 14d and prevent disconnection of the wire.

Each of the distortion detecting elements 51 and 52 is, for example, a piezo-resistance element of a two terminal type or a four terminal type. A piezo-resistance region of the piezo-resistance element is formed by, for example, doping impurities such as phosphorus or boron in the shaft section 12b or the surface of the supporting section 15.

When the distortion detecting element 52 includes a signal based on torsional deformation and bending deformation of the entire shaft sections 14c and 14d, it is also possible to omit the distortion detecting element 51 and detect the behavior about the X axis and the Y axis of the movable mirror section 11 on the basis of only a detection signal of the distortion detecting element 51.

The distortion detecting elements 51 and 52 are electrically connected to the control section 7 via not-shown wires. The control section 7 controls driving of the voltage applying section 4 on the basis of detection signals of the distortion detecting elements 51 and 52.

The arrangement of the light reflection plate 113 and the action by the arrangement are explained with reference to FIG. 5.

As explained above, the center of gravity G of the light reflection plate 113 is shifted from the Y axis in plan view. Consequently, it is possible to vary inertial moments about the Y axis in portions on one side and on the other side of the light reflection plate 113 with respect to the Y axis in plan view. Therefore, it is possible to easily excite the light reflection plate 113 about the Y axis. That is, it is possible to easily swing the light reflection plate 113 about the Y axis with vibration applied from the outside. Specifically, when it is attempted to swing the movable mirror section 11 about the Y axis from a stop state, it is possible to efficiently convert vibration having a vibration component about the Y axis of the frame body section 13 into a driving force for a swing about the Y axis of the movable mirror section 11. As a result, it is possible to reduce a build-up time of the optical scanner 1 (time in which the light reflection plate 113 changes from a stop state to a desired swinging state). Further, it is possible to suppress the light reflection plate 113 from vibrating in the thickness direction with unintended vibration transmitted from the frame body section 13 to the movable mirror section 11.

On the other hand, if the center of gravity G of the light reflection plate 113 coincides with the Y axis in plan view, the inertial moments about the Y axis in the portions on the one side and on the other side of the light reflection plate with respect to the Y axis in plan view are equal. Therefore, in such a case it is difficult to excite the light reflection plate 113 about the Y axis. Specifically, in such a case, when it is attempted to swing the movable mirror section 11 about the Y axis from the stop state, vibration having a vibration component about the Y axis of the frame body section 13 cannot be efficiently converted into a driving force for a swing about the Y axis of the movable mirror section 11. It takes a long time until the light reflection plate 113 changes to a desired swinging state (e.g., a desired swing angle) about the Y axis. Further, the light reflection plate 113 vibrates in the thickness direction with unintended vibration transmitted from the frame body section 13 to the movable mirror section 11.

A distance L between the center of gravity G of the light reflection plate 113 and the Y axis in plan view only has to be set to make it possible to easily excite the light reflection plate 113 about the Y axis as explained above. The distance L is different depending on the shape, the size, and the like of the light reflection plate 113 and is not particularly limited. However, the length L is preferably 0.001 time or more and 0.1 time or less as large as the length of the light reflection plate 113 along the X axis direction and more preferably 0.01 time or more and 0.05 time or less as large as the length of the light reflection plate 113 along the X axis. Consequently, it is possible to make it easy to excite the light reflection plate 113 about the Y axis while suppressing a shift of a swing center axis of the light reflection plate 113.

In this embodiment, the light reflection plate 113 is formed in a shape asymmetrical with respect to the Y axis in plan view. Consequently, even if the thickness of the light reflection plate 113 is fixed or the light reflection plate 113 is made of a single material, it is possible to shift the center of gravity G of the light reflection plate 113 with respect to the Y axis in plan view. As explained above, the light reflection plate 113 is separated from the base 111 in the thickness direction of the light reflection plate 113. Therefore, even if the light reflection plate 113 is formed in an asymmetrical shape with respect to the Y axis in plan view, there is no influence on the shape of the frame body section 13 and the arrangement of the shaft sections 14a, 14b, 14c, and 14d. It is possible to prevent an increase in the size of the frame body section 13 while securing symmetry of a plan view shape of frame body section 13 with respect to the Y axis.

The center of gravity G of the light reflection plate 113 is located on the X axis in plan view.

Therefore, the light reflection plate 113 is formed in a shape symmetrical with respect to the X axis in plan view. Consequently, it is possible to equalize inertial moments about the X axis in portions on one side and on the other side of the light reflection plate 113 with respect to the X axis in plan view. Therefore, it is possible to relatively easily equalize inertial moments about the X axis in portions on one side and on the other side of the second vibration system with respect to the X axis in plan view. That is, it is possible to relatively easily secure symmetry of the second vibration system with respect to the X axis. As a result, it is possible to suppress or prevent occurrence of an unintended vibration mode of the light reflection plate 113.

In this embodiment, the thickness of the light reflection plate 113 is fixed and the plan view shape of the light reflection plate 113 is a circular shape. Therefore, the center of gravity G of the light reflection plate 113 coincides with the center of the light reflection plate 113 (the center of the circle) in plan view.

The center of gravity of the frame body section 13 coincides with an intersection P of the X axis and the Y axis. In this embodiment, the frame body section 13 is formed in a shape symmetrical with respect to each of the X axis and the Y axis in plan view. Consequently, it is possible to suppress or prevent occurrence of an unintended vibration mode of the light reflection plate 113.

The light reflection plate 113 covers the distortion detecting elements 51 and 52 in plan view. Consequently, it is possible to prevent deterioration in detection accuracy of the distortion detecting elements 51 and 52 caused when light that cannot be made incident on the light reflecting section 114 is made incident on the distortion detecting elements 51 and 52.

With the optical scanner 1 explained above, it is possible to vary the inertial moments about the Y axis in the portions on the one side and on the other side of the light reflection plate 113 with respect to the Y axis in plan view. Therefore, it is possible to easily excite the light reflection plate 113 about the Y axis. As a result, it is possible to reduce a build-up time of the optical scanner 1 (time in which the light reflection plate changes from a stop state to a desired swinging state).

In particular, as in this embodiment, in swinging the light reflection plate 113 about the Y axis without directly applying a driving force to the light reflection plate 113, the effect of making it easy to excite the light reflection plate 113 about the Y axis is made conspicuous by varying the inertial moments about the Y axis in the portions on the one side and on the other side of the light reflection plate 113 with respect to the Y axis in plan view.

The light reflection plate 113 is separated from the base 111 in the thickness direction of the light reflection plate 113. Therefore, even if the center of gravity G of the light reflection plate 113 is shifted from the Y axis in plan view, the entire optical scanner 1 is not increased in size. Therefore, it is possible to attain a reduction in the size of the optical scanner 1.

Second Embodiment

A second embodiment of the invention is explained below.

Figure 6:
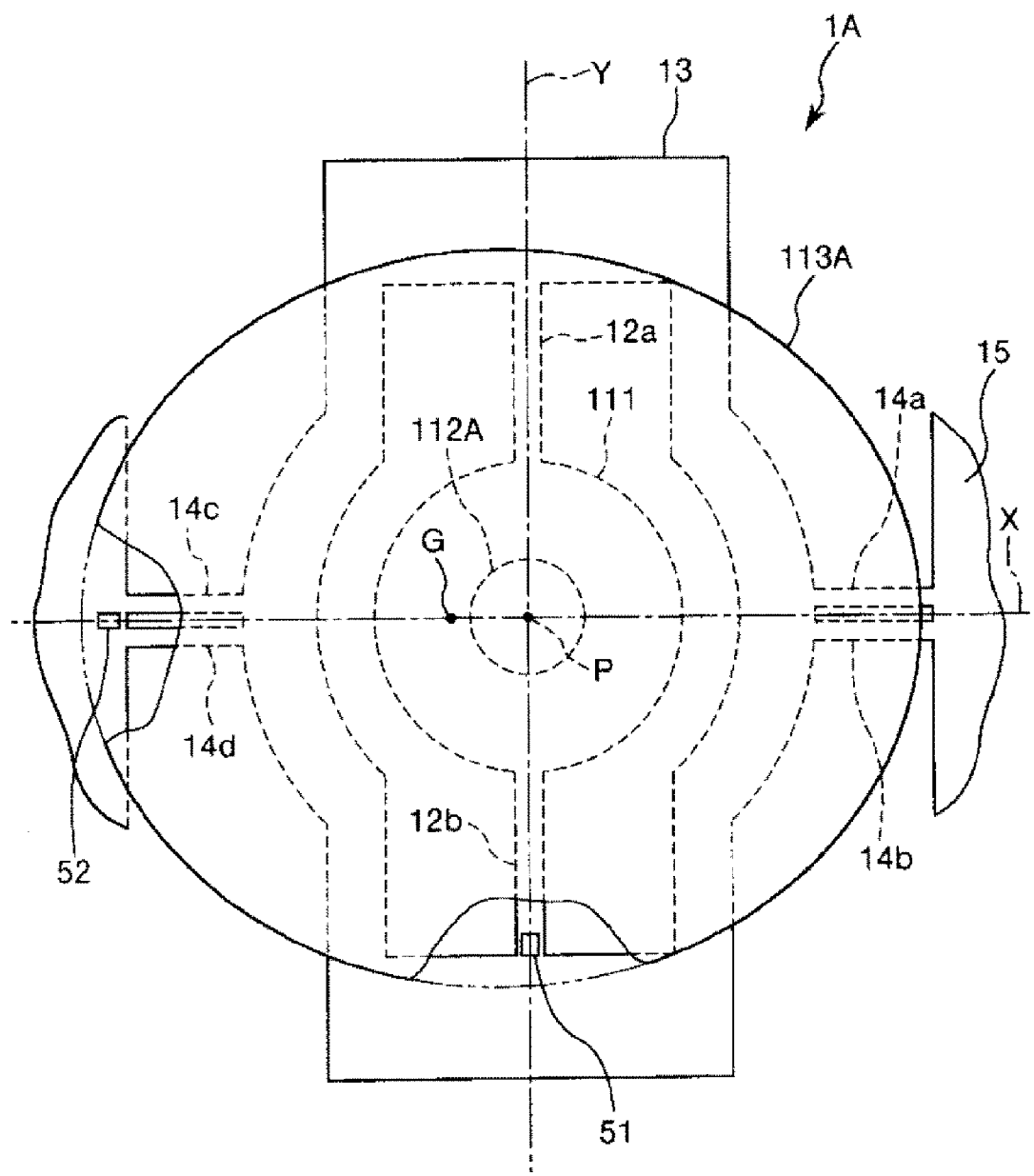
FIG. 6 is a plan view showing an optical scanner (an optical device) according to a second embodiment of the invention.

FIG. 6 is a plan view showing an optical scanner (an optical device) according to the second embodiment of the invention.

Differences of the second embodiment from the first embodiment are mainly explained below. Explanation of similarities is omitted. In FIG. 6, components same as the components in the first embodiment are denoted by the same reference numerals and signs.

The optical scanner in this embodiment is the same as the optical scanner in the first embodiment except that a plan view shape of a light reflection plate is different.

As shown in FIG. 6, an optical scanner 1A in the second embodiment includes a light reflection plate 113A instead of the light reflection plate 113 of the optical scanner 1 in the first embodiment.

The light reflection plate 113A is formed in an elliptical shape in plan view.

The center of gravity G of the light reflection plate 113A is shifted from the Y axis in plan view. In this embodiment, the light reflection plate 113A is arranged such that the major axis extends along the X axis and the minor axis extends along the Y axis. Consequently, it is possible to more efficiently cover the distortion detecting elements 51 and 52 with the light reflection plate 113A in plan view while relatively easily shifting the center of gravity G of the light reflection plate 113A from the Y axis in plan view.

The light reflection plate 113A is coupled to the base 111 via a spacer 112A. The center of gravity G of the light reflection plate 113A and the spacer 112A do not overlap in plan view from the thickness direction of the light reflection plate 113A. Consequently, it is possible to vary inertial moments about the Y axis in portions on one side and on the other side of the light reflection plate 113A with respect to the Y axis in plan view.

With the optical scanner 1A in the second embodiment explained above, as in the first embodiment, it is possible to reduce a build-up time while attaining a reduction in the size of the optical scanner 1A.

Third Embodiment

A third embodiment of the invention is explained.

Figure 7:
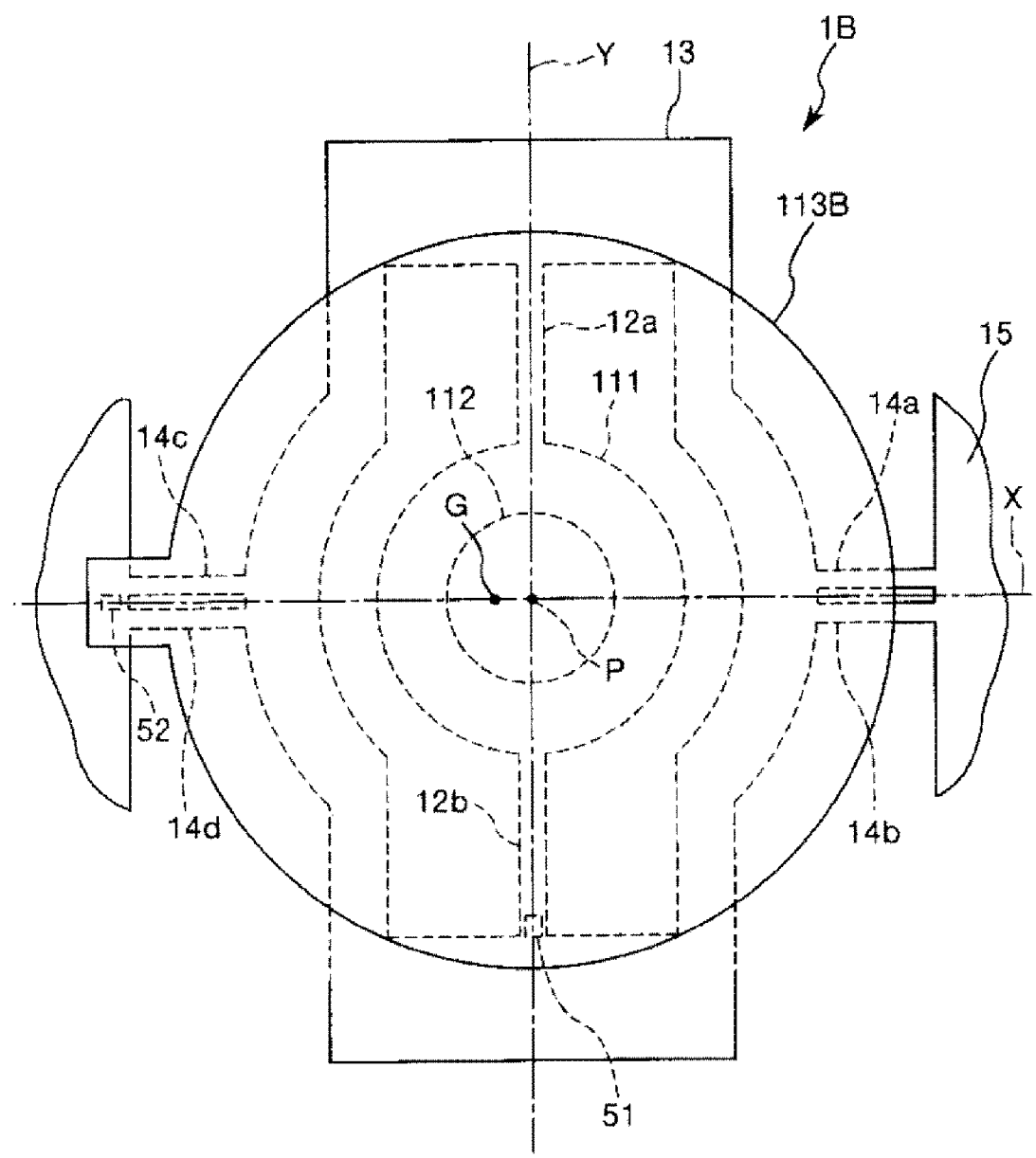
FIG. 7 is a plan view showing an optical scanner (an optical device) according to a third embodiment of the invention.

FIG. 7 is a plan view showing an optical scanner (an optical device) according to the third embodiment of the invention.

Differences of the third embodiment from the first embodiment are mainly explained below. Explanation of similarities is omitted. In FIG. 7, components same as the components in the first and second embodiments are denoted by the same reference numerals and signs.

The optical scanner in this embodiment is the same as the optical scanner in the first embodiment except that a plan view shape of a light reflection plate is different.

As shown in FIG. 7, an optical scanner 1B in the third embodiment includes a light reflection plate 113B instead of the light reflection plate 113 of the optical scanner 1 in the first embodiment.

The light reflection plate 113B is formed in a shape obtained by combining a circle and a rectangle projecting from the outer circumference of the circle in plan view.

The center of gravity G of the light reflection plate 113B is shifted from the Y axis in plan view. In this embodiment, the light reflection plate 113B is arranged such that portions of the rectangle projecting from portions of the circle project along the X axis. Consequently, it is possible to more efficiently cover the distortion detecting elements 51 and 52 with the light reflection plate 113B in plan view while relatively easily shifting the center of gravity G of the light reflection plate 113B from the Y axis in plan view.

With the optical scanner 1B in the third embodiment explained above, as in the first and second embodiments, it is possible reduce a build-up time while attaining a reduction in the size of the optical scanner 1B.

Fourth Embodiment

A fourth embodiment of the invention is explained.

Figure 8:
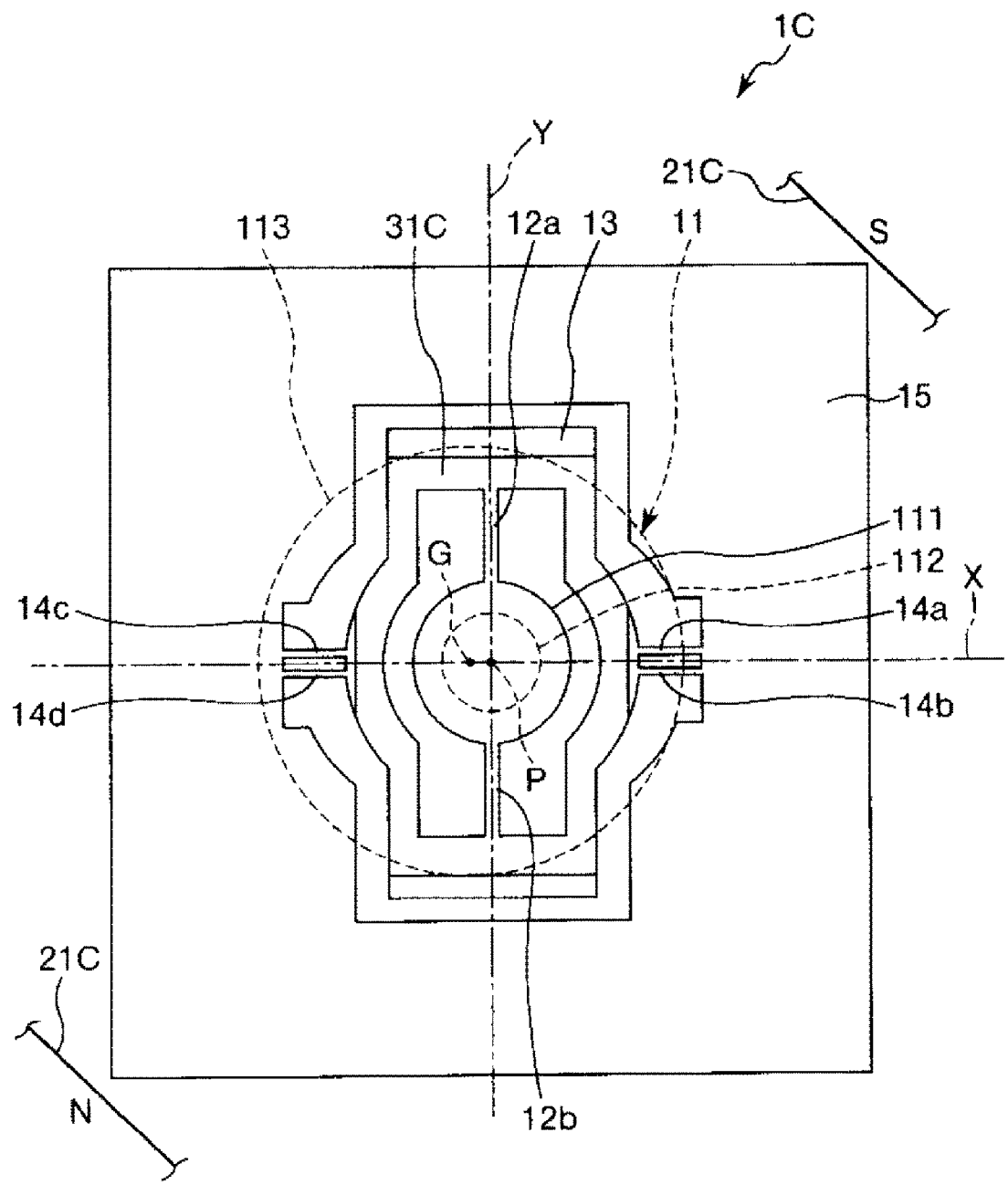
FIG. 8 is a plan view showing an optical scanner (an optical device) according to a fourth embodiment of the invention.
Figure 9:
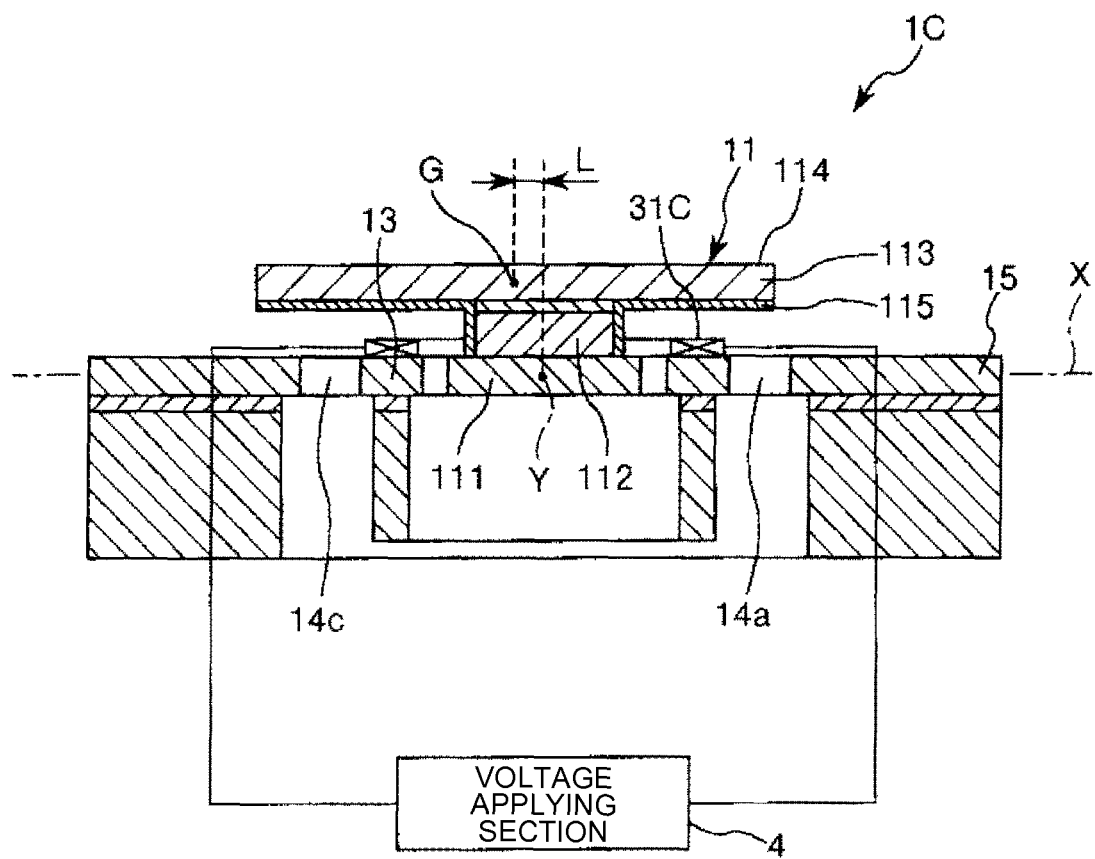
FIG. 9 is a sectional view (a sectional view taken along the X axis) of the optical scanner shown in FIG. 8.

FIG. 8 is a plan view showing an optical scanner (an optical device) according to the fourth embodiment of the invention. FIG. 9 is a sectional view (a sectional view taken along the X axis) of the optical scanner shown in FIG. 8. In the following explanation, for convenience of the explanation, the upper side in FIG. 9 is referred to as "upper" and the lower side in FIG. 9 is referred to as "lower".

Differences of the fourth embodiment from the first embodiment are mainly explained below. Explanation of similarities is omitted. In FIGS. 8 and 9, components same as the components in the first to third embodiments are denoted by the same reference numerals and sings.

The optical scanner in this embodiment is the same as the optical scanner in the first embodiment except that a moving coil system is adopted.

As shown in FIG. 8, an optical scanner 1C in the fourth embodiment includes a permanent magnet 21C and a coil 31C.

The coil 31C is provided on the upper surface of the frame body section 13. The coil 31C is joined to the upper surface of the frame body section 13 in a state in which the coil 31C is wound around along the circumferential direction of the frame body section 13.

The coil 31C may be obtained by joining a coil, which is wound around in advance, to the frame body section 13 with an adhesive or may be patterned on the frame body section 13 by a publicly-known film forming method or plating method.

The coil 31C is electrically connected to the voltage applying section 4.

The coil 31C may be provided on the lower surface (a surface on the opposite side of the light reflection plate 113) of the frame body section 13 or may be provided on both of the upper surface and the lower surface of the frame body section 13.

The permanent magnet 21C includes a pair of magnetic poles (an S pole and an N pole) opposed to each other via the coil 31C in plan view.

The permanent magnet 21C generates a magnetic field in a direction inclining with respect to the X axis and the Y axis. That is, a line segment connecting one magnetic pole and the other magnetic pole of the permanent magnet 21C inclines with respect to the X axis. An inclination angle of the line segment with respect to the X axis is the same as the inclination angle θ in the first embodiment.

The permanent magnet 21C, the coil 31C, and the voltage applying section 4 configure a driving section that swings the movable mirror section 11 about the X axis and the Y axis.

That is, when the voltage applying section 4 applies a voltage to the coil 31C, the movable mirror section 11 is swung about the X axis and the Y axis by mutual action of magnetic fields of the coil 31C and the permanent magnet 21C. Consequently, it is possible to swing the movable mirror section 11 about the X axis and the Y axis with an electromagnetic driving system (a moving coil system) while attaining a reduction in the size of the optical scanner 1C.

With the optical scanner 1C in the fourth embodiment explained above, it is possible to reduce a build-up time while attaining a reduction in the size of the optical scanner 1C.

Fifth Embodiment

A fifth embodiment of the invention is explained.

Figure 10:
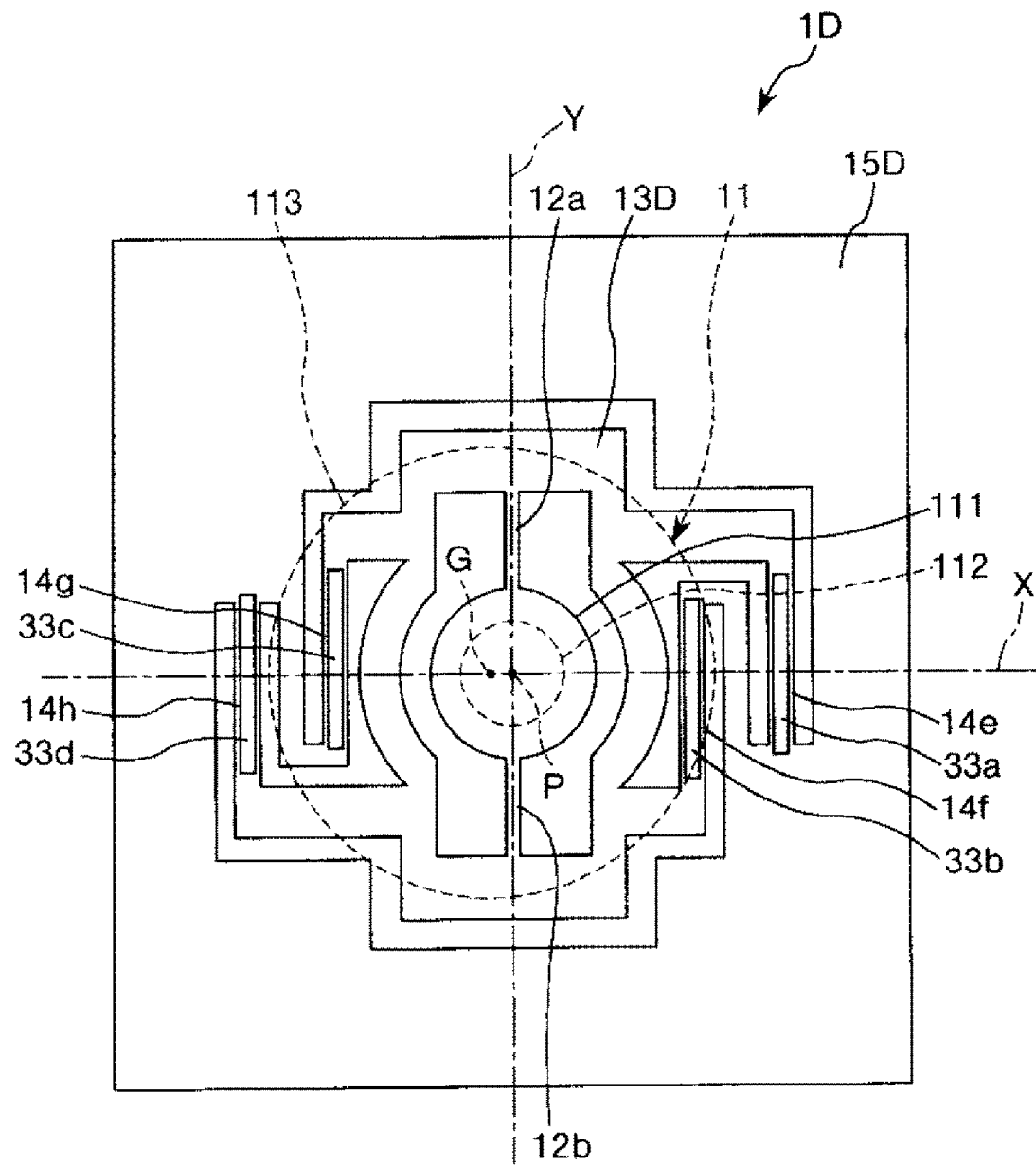
FIG. 10 is a plan view showing an optical scanner (an optical device) according to a fifth embodiment of the invention.
Figure 11:
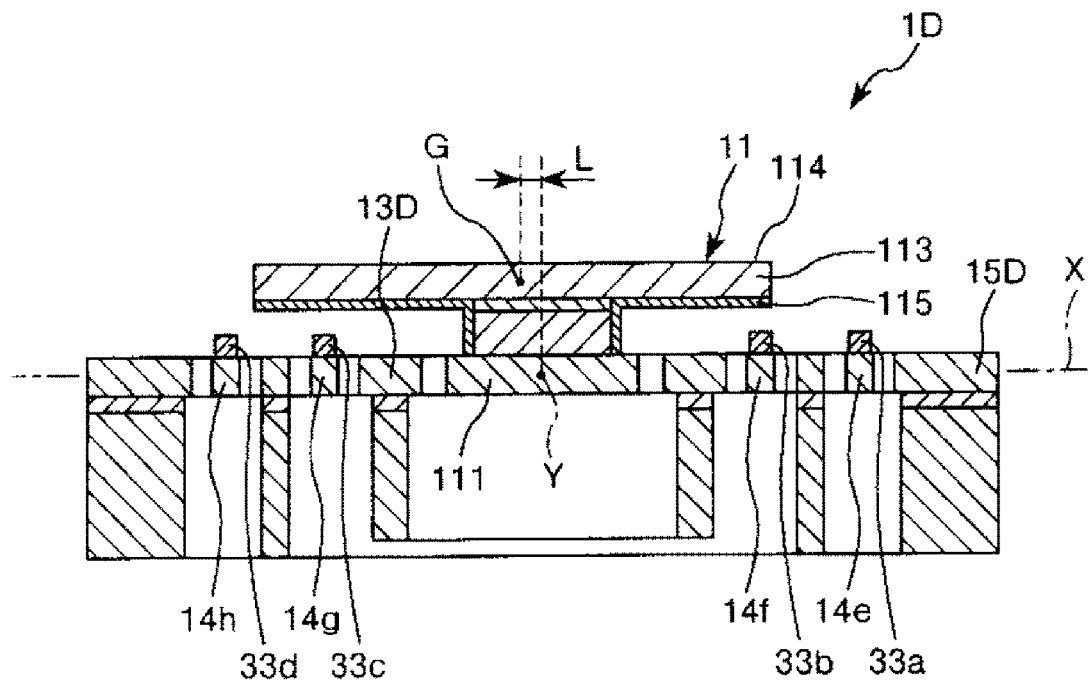
FIG. 11 is a sectional view (a sectional view taken along the X axis) of the optical scanner shown in FIG. 10.
Figure 12:
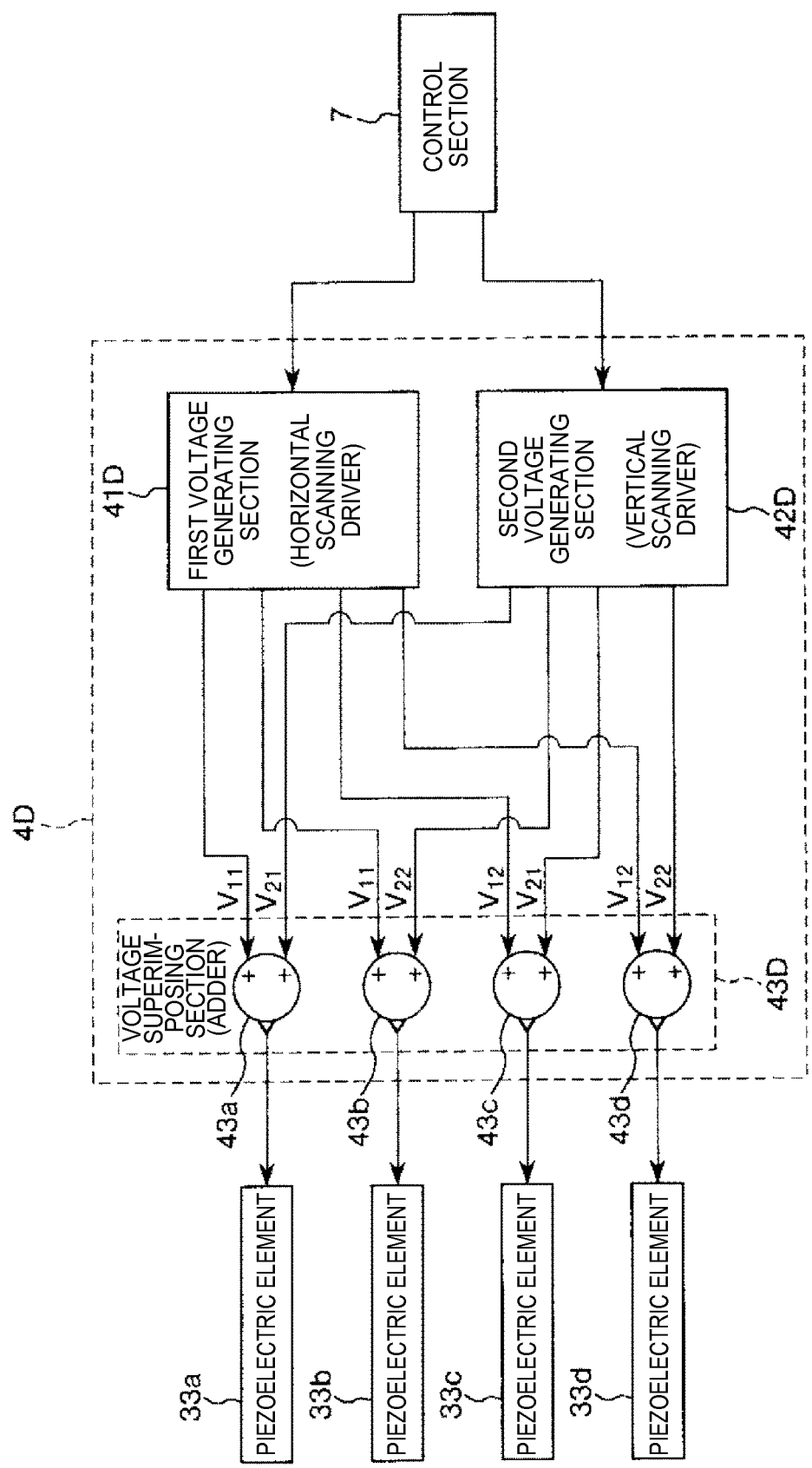
FIG. 12 is a block diagram for explaining a voltage applying section of a driving section included in the optical scanner shown in FIG. 10.

FIG. 10 is a plan view showing an optical scanner (an optical device) according to the fifth embodiment of the invention. FIG. 11 is a sectional view (a sectional view taken along the X axis) of the optical scanner shown in FIG. 10. FIG. 12 is a block diagram for explaining a voltage applying section of a driving section included in the optical scanner shown in FIG. 10. FIGS. 13A to 13D are diagrams of examples of generated voltages in a first voltage generating section and a second voltage generating section shown in FIG. 12. In the following explanation, for convenience of the explanation, the upper side in FIG. 11 is referred to as "upper" and the lower side in FIG. 11 is referred to as "lower".

Differences of the fifth embodiment from the first embodiment are mainly explained below. Explanation of similarities is omitted. In FIGS. 10 to 12, components same as the components in the first to fifth embodiments are denoted by the same reference numerals and signs.

The optical scanner in this embodiment is the same as the optical scanner in the first embodiment except that a piezoelectric driving system is adopted.

As shown in FIG. 10, an optical scanner 1D in the fifth embodiment includes a frame body section 13D, four (two pairs of) shaft sections 14e, 14f, 14g, and 14h (second shaft sections), a supporting section 15D, and four (two pairs of) piezoelectric elements 33a, 33b, 33c, and 33d.

The frame body section 13D is formed in a frame shape and provided to surround the base (the movable section) 111 of the movable mirror section 11.

The frame body section 13D is supported by the supporting section 15D via the shaft sections 14e, 14f, 14g, and 14h. The base 111 of the movable mirror section 11 is supported by the frame body section 13D via the shaft sections 12a and 12b.

Among the two pairs of shaft sections (beams) 14e, 14f, 14g, and 14h, the pair of shaft sections 14e and 14f is provided on one side and the pair of shaft sections 14g and 14h is provided on the other side.

The pairs of shaft sections 14e, 14f, 14g, and 14h are provided point-symmetrical with respect to the center of the frame body section 13D in plan view.

The supporting section 15D is formed to surround the outer periphery of the frame body section 13D.

Each of the pair of shaft sections 14e and 14f couples the frame body section 13D and the supporting section 15D. Similarly, each of the pair of shaft sections 14g and 14h couples the frame body section 13D and the supporting section 15D.

The shaft sections 14e, 14f, 14g, and 14h are elastically deformable and formed in a longitudinal shape and extend in parallel to the Y axis. In the two pairs of shaft sections 14e, 14f, 14g, and 14h, the shaft sections 14e and 14g and the shaft sections 14f and 14h are bent in opposite directions each other, whereby the frame body section 13D can be swung (turned) about the X axis. The shaft sections 14e and 14f and the shaft sections 14g and 14h are bent in opposite directions each other, whereby the frame body section 13D can be swung (turned) about the Y axis.

In order to turn the frame body section 13D about the X axis and the Y axis, the piezoelectric element 33a is provided on the shaft section 14e, the piezoelectric element 33b is provided on the shaft section 14f, the piezoelectric element 33c is provided on the shaft section 14g, and the piezoelectric element 33d is provided on the shaft section 14h.

The piezoelectric elements 33a and 33b are representatively explained in detail. The piezoelectric elements 33c and 33d are the same as the piezoelectric elements 33a and 33b.

The piezoelectric element 33a is joined to the upper surface of the shaft section 14e and configured to expand and contract in the longitudinal direction of the shaft section 14e. Consequently, the piezoelectric element 33a can flexurally deform the shaft section 14e in the up down direction according to the expansion and the contraction of the piezoelectric element 33a. The piezoelectric element 33b is joined to the upper surface of the shaft section 14f and configured to expand and contract in the longitudinal direction of the shaft section 14f. Consequently, the piezoelectric element 33b can flexurally deform the shaft section 14f in the up down direction according to the expansion and the contraction of the piezoelectric element 33b.

In other words, the piezoelectric element 33a extends along the longitudinal direction of the shaft section 14e and expands and contracts in the extending direction to thereby flexurally deform the shaft section 14e. Consequently, with a relatively simple configuration, it is possible to more surely flexurally deform the shaft section 14e using the piezoelectric element 33a. Similarly, the piezoelectric element 33b extends along the longitudinal direction of the shaft section 14f and expands and contracts in the extending direction to thereby flexurally deform the shaft section 14f. Consequently, with a relatively simple configuration, it is possible to more surely flexurally deform the shaft section 14f using the piezoelectric element 33b.

Each of the piezoelectric elements 33a and 33b includes, although not shown in the figure, a piezoelectric layer formed using a piezoelectric material as a main material and a pair of electrodes configured to sandwich the piezoelectric layer.

Examples of the piezoelectric material include zinc oxide, aluminum nitride, lithium tantalate, lithium niobate, potassium niobate, lead zirconate titanate (PZT), and barium titanate. Besides, there are various piezoelectric materials. One kind of the piezoelectric material can be used or two or more kinds of the piezoelectric materials can be used in combination. In particular, a piezoelectric material mainly including at least one kind of zinc oxide, aluminum nitride, lithium tantalate, lithium niobate, potassium niobate, and lead zirconate titanate is preferable. The piezoelectric layers of the piezoelectric elements 33a and 33b are formed of such materials, whereby it is possible to drive the optical scanner 1D at a higher frequency.

The piezoelectric element 33a is provided to cover substantially the entire upper surface of the shaft section 14e. Therefore, the piezoelectric element 33a is provided over substantially the entire region in the longitudinal direction of the shaft section 14e. Consequently, it is possible to more largely flexurally deform the shaft section 14e according to the actuation of the piezoelectric element 33a. Similarly, the piezoelectric element 33b is provided to cover substantially the entire upper surface of the shaft section 14f. Therefore, the piezoelectric element 33b is provided over substantially the entire region in the longitudinal direction of the shaft section 14f. Consequently, it is possible to more largely flexurally deform the shaft section 14f according to the operation of the piezoelectric element 33b.

Both the piezoelectric elements 33a and 33b are provided on the upper surface side. Therefore, when one of the piezoelectric elements 33a and 33b is caused to expand and the other is caused to contract, it is possible to flexurally deform the pair of shaft sections 14e and 14f in opposite directions each other.

The piezoelectric elements 33c and 33d are configured the same as the piezoelectric elements 33a and 33b. Both the piezoelectric elements 33c and 33d are provided on the upper surface side like the piezoelectric elements 33a and 33b. Therefore, when one of the piezoelectric elements 33c and 33d is caused to expand and the other is caused to contract, it is possible to flexurally deform the pair of shaft sections 14g and 14h in opposite directions.

The piezoelectric elements 33a, 33b, 33c, and 33d are connected to a below-mentioned voltage applying section 4D via not-shown wires.

The voltage applying section 4D includes, as shown in FIG. 12, a first voltage generating section 41D configured to generate a first voltage for turning the movable mirror section 11 about the Y axis, a second voltage generating section 42D configured to generate a second voltage for turning the movable mirror section 11 about the X axis, and a voltage superimposing section 43D configured to superimpose the first voltage and the second voltage and apply a superimposed voltage to the piezoelectric elements 33a, 33b, 33c, and 33d.

As shown on the right side of FIGS. 13A to 13D, the first voltage generating section 41D generates voltages (voltages for horizontal scanning) that cyclically change at the cycle $T_1$. That is, the first voltage generating section 41D generates two kinds of first voltages $V_{11}$ and $V_{12}$ that cyclically change at the first frequency ($1/T_1$).

Figure 13A:
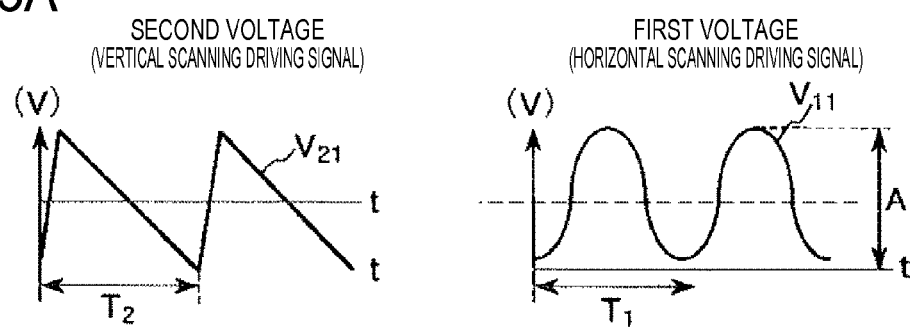
FIGS. 13A-13D are diagrams showing examples of generated voltages of a first voltage generating section and a second voltage generating section shown in FIG. 12.
Figure 13B:
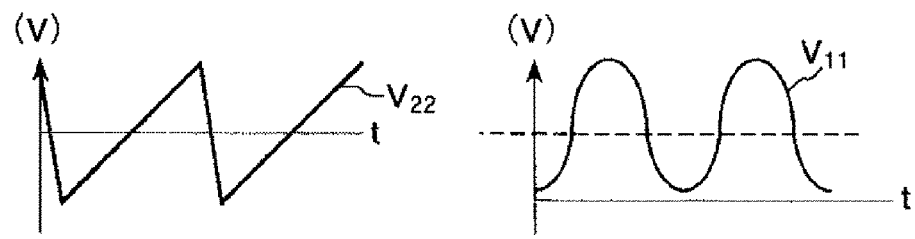

More specifically, the first voltage generating section 41D generates, as voltages for horizontal scanning (horizontal scanning driving signals) respectively applied to the piezoelectric elements 33a and 33b, the first voltages $V_{11}$ that cyclically change at the cycle $T_1$ as shown on the right side of FIGS. 13A and 13B.

The first voltage $V_{11}$ has a waveform like a sine wave. Therefore, the optical scanner 1D can effectively main-scan light. The waveform of the first voltage $V_{11}$ is not limited to this waveform.

The first frequency ($1/T_1$) is not particularly limited as long as the first frequency ($1/T_1$) is a frequency suitable for the horizontal scanning. However, the first frequency ($1/T_1$) is preferably 10 to 40 kHz. The first frequency ($1/T_1$) is preferably set to substantially coincide with a torsional resonance frequency of a vibration system configured by the movable mirror section 11 and the shaft sections 12a and 12b. That is, the torsional resonance frequency of the vibration system is preferably designed to be a frequency suitable for the horizontal scanning.

Figure 13C:
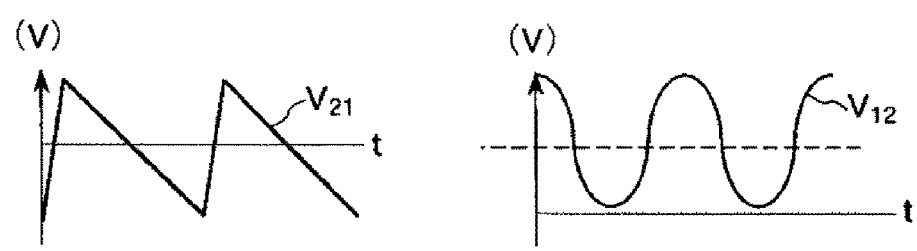
Figure 13D:
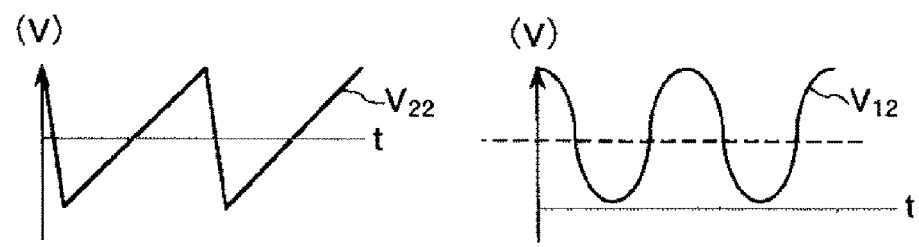

The first voltage generating section 41D generates, as voltages for horizontal scanning (horizontal scanning driving signals) respectively applied to the piezoelectric elements 33c and 33d, the first voltages $V_{22}$ that cyclically change at the frequency $T_1$ as shown on the right side of FIGS. 13C and 13D. The first voltage $V_{22}$ has the same waveform as the first voltage $V_{11}$. However, the phase of the first voltage $V_{22}$ is shifted 180° with respect to the first voltage $V_{11}$.

On the other hand, the second voltage generating section 42D generates voltages (voltages for vertical scanning) that cyclically change at the cycle $T_2$ different from the cycle $T_1$ as shown on the left side of FIGS. 13A to 13D. That is, the second voltage generating section 42D generates second voltages $V_{21}$ and $V_{22}$ that cyclically change at two kinds of the second frequency ($1/T_2$) different from the first frequency ($1/T_1$).

More specifically, the second voltage generating section 42D generates, as voltages for vertical scanning (vertical scanning driving signals) respectively applied to the piezoelectric elements 33a and 33c, the second voltages $V_{21}$ that cyclically change at the cycle $T_2$ different from the cycle $T_1$ as shown on the left side of FIGS. 13A and 13C.

The second voltage $V_{21}$ has a waveform like a saw-tooth wave. Therefore, the optical scanner 1D can effectively sub-scan light. The waveform of the second voltage $V_{21}$ is not limited to this form.

The second frequency ($1/T_2$) is not particularly limited as long as the second frequency ($1/T_2$) is a frequency different from the first frequency ($1/T_1$) and suitable for the vertical scanning. However, the second frequency ($1/T_2$) is preferably smaller than the first frequency ($1/T_1$). That is, the cycle $T_2$ is preferably longer than the cycle $T_1$.

The second frequency (1/T2) is preferably 40 to 80 Hz (about 60 Hz). Consequently, it is possible to turn the movable mirror section 11 about each of the two axes (the X axis and the Y axis) orthogonal to each other at a frequency suitable for rendering on a display.

The second voltage generating section 42D generates, as voltages for vertical scanning (vertical scanning driving signals) respectively applied to the piezoelectric elements 33b and 33d, the second voltages $V_{22}$ that cyclically change at the cycle T2 as shown on the left side of FIGS. 13B and 13D. The second voltage $V_{22}$ has a waveform obtained by reversing the waveform of the second voltage $V_{21}$ with respect to a certain reference voltage.

Each of the first voltage generating section 41D and the second voltage generating section 42D is connected to the control section 7 and driven on the basis of a signal output from the control section 7.

The voltage superimposing section 43D is connected to the first voltage generating section 41D and the second voltage generating section 42D. The voltage superimposing section 43D includes the adder 43a for applying a voltage to the piezoelectric element 33a, an adder 43b for applying a voltage to the piezoelectric element 33b, an adder 43c for applying a voltage to the piezoelectric element 33c, and an adder 43d for applying a voltage to the piezoelectric element 33d.

The adder 43a is configured to receive the first voltage $V_{11}$ from the first voltage generating section 41D, receive the second voltage $V_{21}$ from the second voltage generating section 42D, superimpose the voltages, and apply a superimposed voltage to the piezoelectric element 33a.

The adder 43b is configured to receive the first voltage $V_{11}$ from the first voltage generating section 41D, receive the second voltage $V_{22}$ from the second voltage generating section 42D, superimpose the voltages, and apply a superimposed voltage to the piezoelectric element 33b.

The adder 43c is configured to receive the first voltage $V_{12}$ from the first voltage generating section 41D, receive the second voltage $V_{21}$ from the second voltage generating section 42D, superimpose the voltages, and apply a superimposed voltage to the piezoelectric element 33c.

The adder 43d is configured to receive the first voltage $V_{12}$ from the first voltage generating section 41D, receive the second voltage $V_{22}$ from the second voltage generating section 42D, superimpose the voltages, and apply a superimposed voltage to the piezoelectric element 33d.

The scanner 1D having the configuration explained above is driven as explained below.

For example, the voltages $V_{11}$ and $V_{21}$ shown in FIG. 13A are superimposed and applied to the piezoelectric element 33a. The voltages $V_{11}$ and $V_{22}$ shown in FIG. 13B are superimposed and applied to the piezoelectric element 33b. In synchronization with this, the voltages $V_{12}$ and $V_{21}$ shown in FIG. 13C are superimposed and applied to the piezoelectric element 33c. The voltages $V_{12}$ and $V_{22}$ shown in FIG. 13D are superimposed and applied to the piezoelectric element 33d.

Then, a state in which the piezoelectric elements 33a and 33b are expanded and the piezoelectric elements 33c and 33d are contracted and a state in which the piezoelectric elements 33a and 33b are contracted and the piezoelectric elements 33c and 33d are expanded are alternately repeated at the first frequency ($1/T_1$). At the same time, a state in which the piezoelectric elements 33a and 33c are expanded and the piezoelectric elements 33b and 33d are contracted and a state in which the piezoelectric elements 33a and 33c are contracted and the piezoelectric elements 33b and 33d are expanded are alternately repeated at the second frequency ($1/T_2$).

In other words, a ratio of a range in which the piezoelectric elements 33b and 33d can be expanded and contracted (length in which the piezoelectric elements 33b and 33d can be displaced) to a range in which the piezoelectric elements 33a and 33c can be expanded and contracted (length in which the piezoelectric elements 33a and 33c can be displaced) is changed at the second frequency ($1/T_2$). At the same time, the piezoelectric elements 33a and 33b and the piezoelectric elements 33c and 33d are expanded in opposite directions each other.

The piezoelectric elements 33a to 33d operate as explained above, whereby, while the shaft sections 14e, 14f, 14g, and 14h are mainly flexurally deformed, the frame body section 13D swings (turns) about the X axis at the second frequency ($1/T_2$) while swinging (turning) about the Y axis at the first frequency ($1/T_1$).

As explained above, the voltage applying section 4D applies a voltage to the piezoelectric elements 33a, 33b, 33c, and 33d to thereby turn the movable mirror section 11 about the X axis at the second frequency ($1/T_2$) while turning the movable mirror section 11 about the Y axis at the first frequency ($1/T_1$).

Consequently, it is possible to swing the movable mirror section 11 about the X axis and the Y axis by the piezoelectric driving system while attaining a reduction in the size of the optical scanner 1D.

The form of the optical scanner of the piezoelectric driving system is not limited to the form explained above. The shape of the piezoelectric elements 33a, 33b, 33c, and 33d only has to be a shape for enabling the piezoelectric elements 33a, 33b, 33c, and 33d to expand and contract to a degree enough for flexurally deforming the shaft sections 14e, 14f, 14g, and 14h and may be a trapezoidal shape in plan view. Concerning a method of connection of the frame body section 13D and the supporting section 15D by the shaft sections 14e, 14f, 14g, and 14h, the shaft sections 14e, 14f, 14g, and 14h only have to be configured to be capable of swinging the frame body section 13D about the X axis while swinging the frame body section 13D about the Y axis by being flexurally deformed.

The optical scanner 1D in the fifth embodiment explained above, as in the first to fifth embodiments, it is possible to reduce a build-up time while attaining a reduction in the size of the optical scanner 1D.

Image Display Apparatus According to an Embodiment

Figure 14:
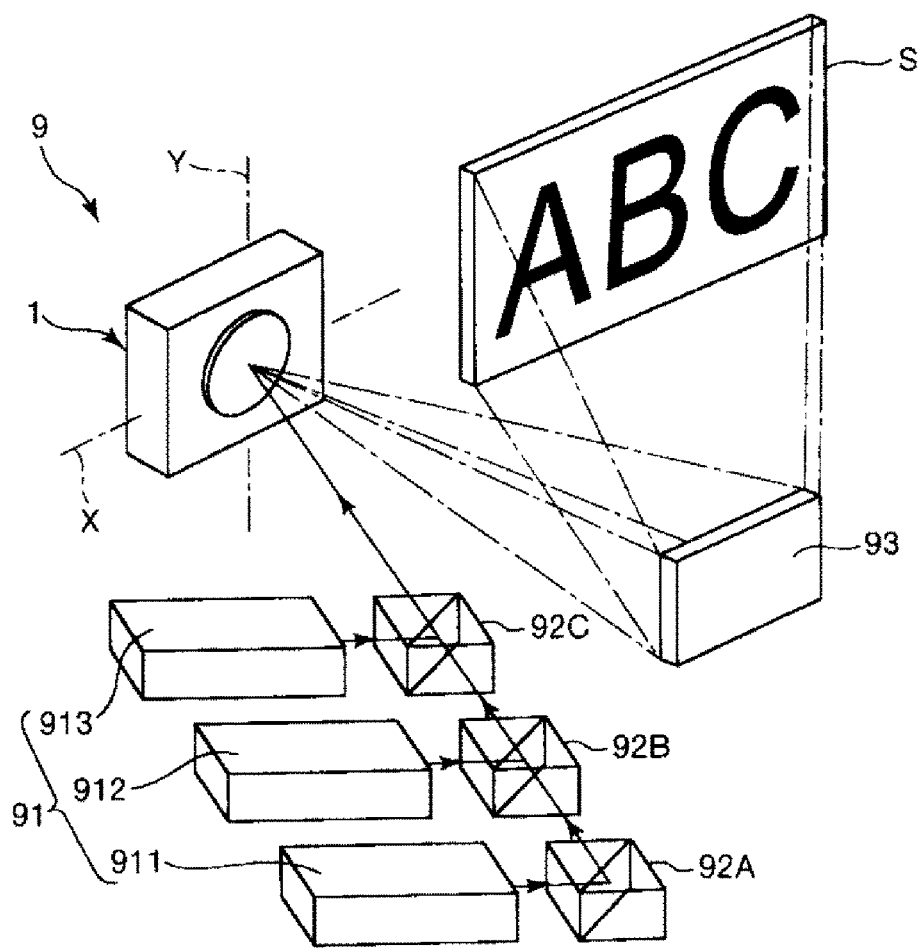
FIG. 14 is a diagram schematically showing an image display apparatus according to an embodiment of the invention.

FIG. 14 is a diagram schematically showing an image display apparatus according to an embodiment of the invention.

In this embodiment, as an example of the image display apparatus, a display for imaging is explained in which the optical scanner 1 is used as an optical scanner. The longitudinal direction of a screen S is referred to as "crosswise direction" and a direction orthogonal to the longitudinal direction is referred to as "lengthwise direction". The X axis is parallel to the crosswise direction of the screen S and the Y axis is parallel to the lengthwise direction of the screen S.

An image display apparatus (a projector) 9 includes a light source device (a light source) 91 that emits light such as laser, a plurality of dichroic mirrors 92A, 92B, and 92C, and the optical scanner 1.

The light source device 91 includes a red light source device 911 that emits red light, a blue light source device 912 that emits blue light, and a green light source device 913 that emits green light.

The dichroic mirrors 92A, 92B, and 92C are optical elements that combine lights respectively emitted from the red light source device 911, the blue light source device 912, and the green light source device 913.

In the image display apparatus 9, lights emitted from the light source device 91 (the red light source device 911, the blue light source device 912, and the green light source device 913) are combined in the dichroic mirrors 92A, 92B, and 92C on the basis of image information output from a not-shown host computer. Combined light is two-dimensionally scanned by the optical scanner 1 to form a color image on the screen S.

In the two-dimensional scanning, the light reflected on the light reflecting section 114 is scanned (main-scanned) in the crosswise direction of the screen S by the turning about the Y axis of the movable mirror section 11 of the optical scanner 1. On the other hand, the light reflected on the light reflecting section 114 is scanned (sub-scanned) in the lengthwise direction of the screen S by the turning about the X axis of the movable mirror section 11 of the optical scanner 1.

In FIG. 14, after the light combined by the dichroic mirrors 92A, 92B, and 92C is two-dimensionally scanned by the optical scanner 1, the light is reflected on a fixed mirror 93 to form an image on the screen S. However, the fixed mirror 93 may be omitted and the light two-dimensionally scanned by the optical scanner 1 may be directly irradiated on the screen S.

With the image display apparatus 9, since the image display apparatus 9 includes the optical scanner 1, it is possible to reduce a build-up time while attaining a reduction in the size of the image display apparatus 9.

Application examples of the image display apparatus are explained below.

Application Example 1 of the Image Display Apparatus

Figure 15:
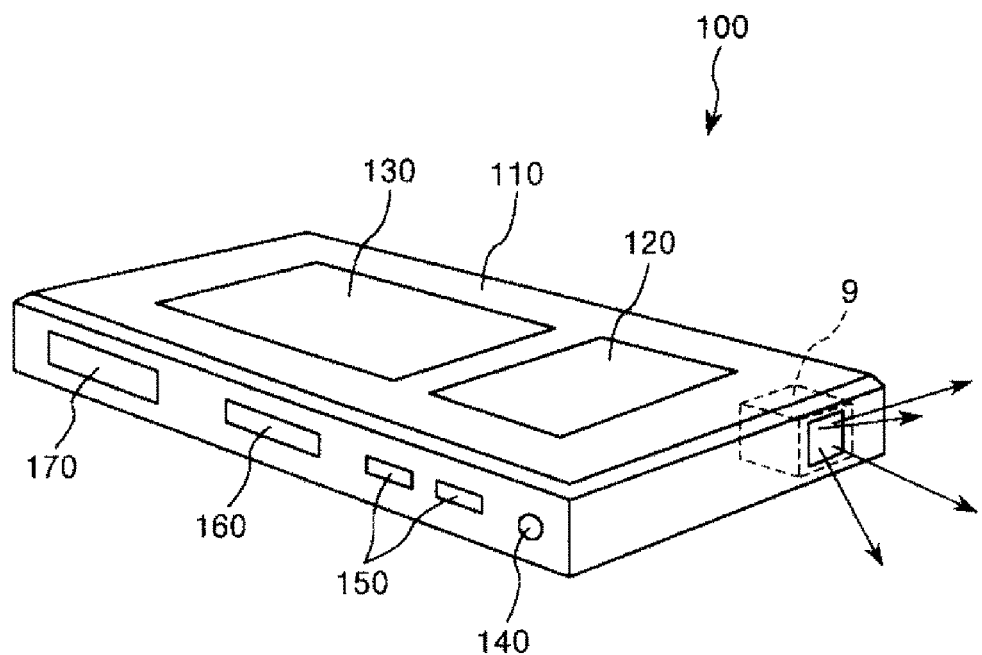
FIG. 15 is a perspective view showing an application example 1 of the image display apparatus in the embodiment.

FIG. 15 is a perspective view showing an application example 1 of the image display apparatus in the embodiment.

As shown in FIG. 15, the image display apparatus 9 can be applied to a portable image display apparatus 100.

The portable image display apparatus 100 includes a casing 110 formed at dimensions for enabling gripping by a hand and the image display apparatus 9 incorporated in the casing 110. A predetermined image can be displayed on a predetermined surface such as a screen or a desk by the portable image display apparatus 100.

The portable image display apparatus 100 includes a display 120 that displays predetermined information, a key pad 130, an audio port 140, a control button 150, a card slot 160, and an AV port 170.

The portable image display apparatus 100 may include other functions such as a communication function and a GPS reception function.

Application Example 2 of the Image Display Apparatus

Figure 16:
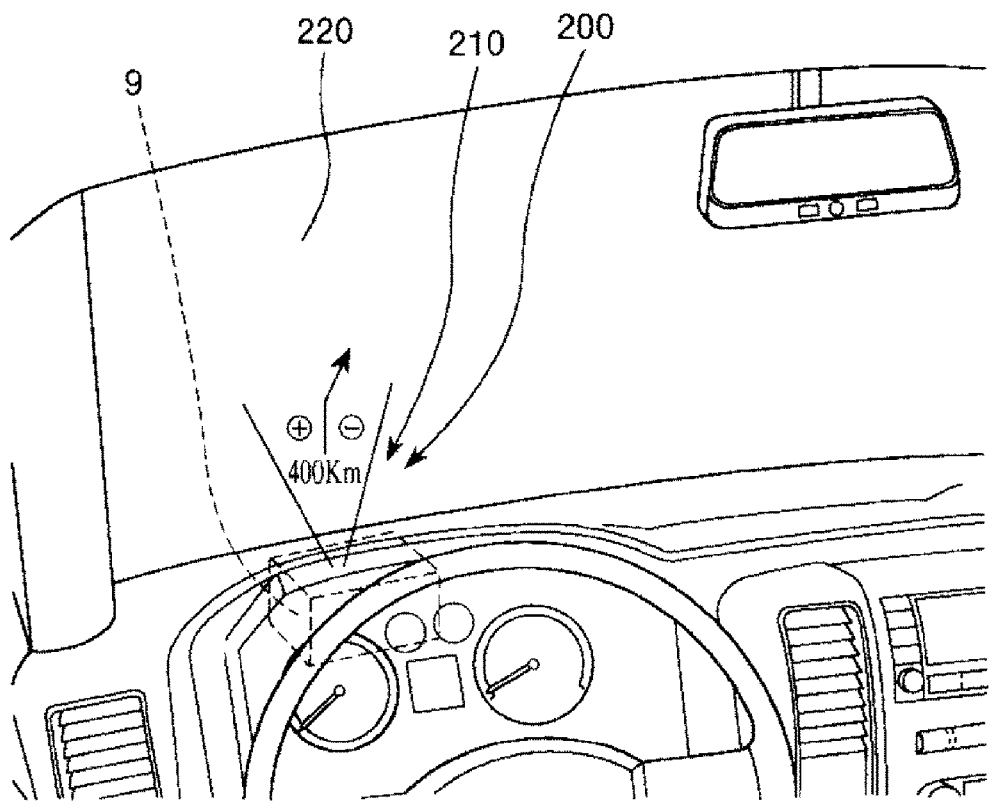
FIG. 16 is a perspective view of an application example 2 of the image display apparatus in the embodiment.

FIG. 16 is a perspective view showing an application example 2 of the image display apparatus in the embodiment.

As shown in FIG. 16, the image display apparatus 9 can be applied to a head-up display system 200.

In the head-up display system 200, the image display apparatus 9 is mounted on a dashboard of an automobile to configure a head-up display 210. A predetermined image such as guidance display to a destination can be displayed on a windshield 220 by the head-up display 210.

The head-up display system 200 is not limitedly applied to the automobile and can also be applied to, for example, an airplane and a ship.

Application Example 3 of the Image Display Apparatus

Figure 17:
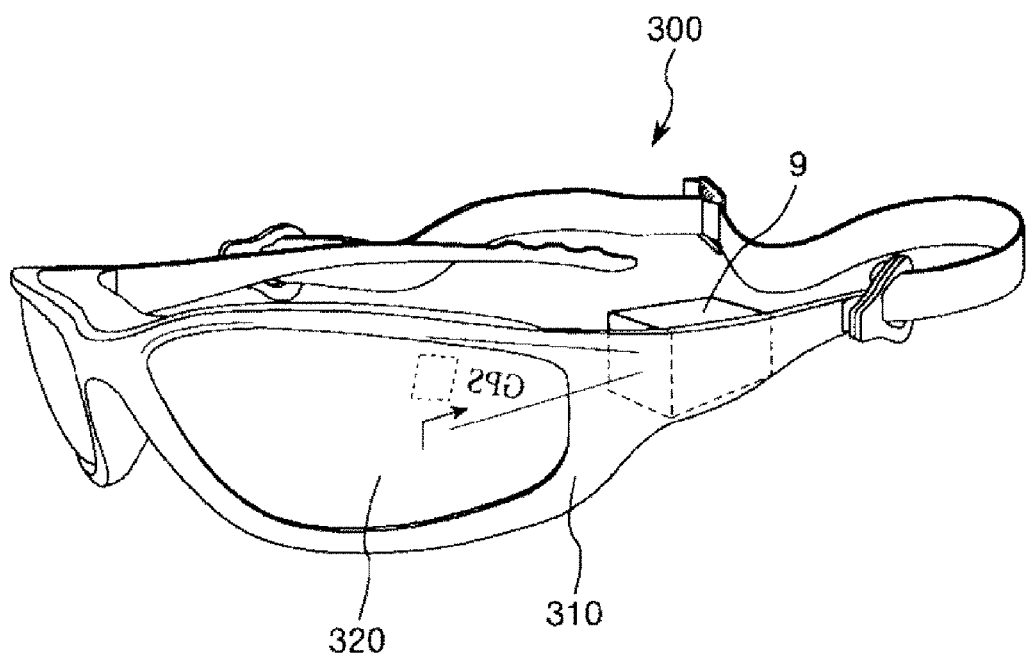
FIG. 17 is a perspective view of an application example 3 of the image display apparatus in the embodiment.

FIG. 17 is a perspective view of an application example 3 of the image display apparatus in the embodiment.

As shown in FIG. 17, the image display apparatus 9 can be applied to a head-mounted display 300.

The head-mounted display 300 includes eyeglasses 310 and the image display apparatus 9 mounted on the eyeglasses 310. A predetermined image visually recognized by one eye is displayed on a display section 320 provided in a part, which is originally a lens, of the eyeglasses 310.

The display section 320 may be transparent or may be opaque. When the display section 320 is transparent, information from the image display apparatus 9 can be used in addition to information from the real world.

A pair of the image display apparatuses 9 may be provided in the head-mounted display 300 to display images visually recognized by both the eyes on a pair of the display sections 320.

The optical device, the optical scanner, and the image display apparatus in the embodiments of the invention are explained above. However, the invention is not limited to the embodiments. For example, in the optical device, the optical scanner, and the image display apparatus in the embodiments, the components of the sections can be replaced with any components including the same functions. Further, any other components can be added.

In the invention, any two or more components (features) in the embodiments may be combined.

In the example explained in the embodiments, the two (the pair of) first shaft sections are provided. However, the number of the first shaft sections is not limited to two. For example, two pairs or more of the first shaft sections may be provided.

In the example explained in the embodiments, four (two pairs of) second shaft sections are provided. However, the number of the second shaft sections is not limited to four. For example, a pair of or three or more pairs of the second shaft sections may be provided.

In the example explained in the embodiment, the light reflection plate covers the entire first shaft section in plan view. However, if the light reflection plate covers at least a part (an end portion on the base side of the movable mirror section) of the first shaft section in plan view, it is possible to attain the effects such as the reduction in the size of the optical device, the increase in the area of the light reflection plate, the prevention of a dynamic bend of the light reflection plate, and the prevention of stray light due to the end portion on the base side of the first shaft section.

In the example explained in the embodiments, the SOI substrate is machined to form the light reflection plate and the spacer. However, a method of forming the light reflection plate and the spacer is not limited to this. For example, the light reflection plate and the spacer may be formed from separate substrates. A base made of a single material such as a silicon substrate or a glass substrate may be machined to integrally form the light reflection plate and the spacer.

The spacer between the light reflection plate and the base may be a solder ball. In this case, for example, metal films only have to be respectively formed on surfaces on the spacer side of the light reflection plate and the base and joined via the solder ball.

In the example explained in the embodiments, the optical device is applied to the optical scanner. However, the optical device is not limitedly applied to the optical scanner and can also be applied to other optical devices such as an optical switch and an optical attenuator.

In the example explained in the embodiments, the driving force is directly applied to only the frame body section. However, the driving force may be directly applied to each of the frame body section and the movable section to swing the light reflection plate about the first axis and the second axis. Even in such a case, it is possible to attain the effect of preventing or suppressing unnecessary vibration of the light reflection plate due to unnecessary vibration transmitted to the movable section from the frame body section via the first shaft section.

In the example explained above, the light reflection plate is formed in the shape asymmetrical with respect to the first axis in plan view. However, the light reflection plate may be formed in a shape symmetrical with respect to the first axis in plan view as long as the center of gravity of the light reflection plate is shifted from the first Y axis in plan view. In this case, for example, thicknesses and materials only have to be varied in portions on one side and on the other side of the light reflection plate in plan view or a concave section added with a weight only has to be provided on a plate surface in the portion on one side of the light reflection plate in plan view.

The entire disclosure of Japanese Patent Application No. 2013-123469, filed Jun. 12, 2013 is expressly incorporated by reference herein.

What is claimed is:

1. An optical device comprising:
a movable section capable of swinging about a first axis;
a frame body section capable of swinging about a second axis crossing the first axis;
a first shaft section configured to connect the movable section and the frame body section; and
a light reflection plate fixed to the movable section and provided with a light reflecting section having light reflectivity, wherein
the movable section includes the light reflection plate fixed to a base, a center of gravity of the light reflection plate being shifted from a center of gravity of the base and the center of gravity of the base being aligned with the first axis,
in plan view from a thickness direction of the light reflection plate, the center of gravity of the light reflection plate is shifted from the first axis,
the light reflection plate is formed in a shape symmetrical with respect to an axis through the center of gravity of the light reflection plate and parallel to the first axis, and
the light reflection plate is fixed to the base such that the axis through the center of gravity of the light reflection plate is not aligned with the first axis through the center of gravity of the base.

2. The optical device according to claim 1, wherein the light reflection plate is formed in a shape asymmetrical with respect to the first axis in the plan view.

3. The optical device according to claim 2, wherein the light reflection plate is formed in a shape symmetrical with respect to the second axis in the plan view.

4. The optical device according to claim 2, wherein the frame body section is formed in a shape symmetrical with respect to each of the first axis and the second axis in the plan view.

5. The optical device according to claim 1, further comprising a first distortion detection element arranged in the first shaft section and configured to detect deformation of the first shaft section, wherein
the light reflection plate covers the first distortion detecting element in the plan view.

6. The optical device according to claim 1, further comprising:
a fixed section;
a second shaft section configured to connect the frame body section and the fixed section; and
a second distortion detecting element arranged in the second shaft section and configured to detect deformation of the second shaft section, wherein
the light reflection plate covers the second distortion detecting element in the plan view.

7. The optical device according to claim 1, further comprising:
- a permanent magnet arranged in the frame body section;
- a coil arranged to be opposed to the frame body section; and
- a voltage applying section configured to apply a voltage to the coil, wherein
- the voltage applying section applies the voltage to the coil to thereby swing the movable section about the first axis and the second axis.

8. The optical device according to claim 1, further comprising:
- a coil arranged in the frame body section;
- a permanent magnet configured to generate a magnetic field acting on the coil; and
- a voltage applying section configure to apply a voltage to the coil, wherein
- the voltage applying section applies the voltage to the coil to thereby swing the movable section about the first axis and the second axis.

9. The optical device according to claim 1, further comprising:
- a fixed section;
- a second shaft section configured to connect the frame body section and the fixed section;
- a piezoelectric element provided in the second shaft section; and
- a voltage applying section configured to apply a voltage to the piezoelectric element, wherein
- the voltage applying section applies the voltage to the piezoelectric element to thereby swing the movable section about the first axis and the second axis.

10. The optical device according to claim 7, wherein the voltage applying section includes:
- a first voltage generating section configured to generate a first voltage having a first frequency;
- a second voltage generating section configured to generate a second voltage having a second frequency different from the first frequency; and
- a voltage superimposing section configured to superimpose the first voltage and the second voltage, and
- the voltage applying section swings the movable section about the first axis at the first frequency and swings the movable section about the second axis at the second frequency.

11. The optical device according to claim 1, further comprising a spacer configured to couple the movable section and the light reflection plate, wherein
the light reflection plate is separated from the movable section in the thickness direction of the light reflection plate.

12. The optical device according to claim 11, wherein the center of gravity of the light reflection plate and the spacer do not overlap in plan view from the thickness direction of the light reflection plate.

13. An optical scanner comprising:
- a movable section capable of swinging about a first axis;
- a frame body section capable of swinging about a second axis crossing the first axis;
- a first shaft section configured to connect the movable section and the frame body section; and
- a light reflection plate fixed to the movable section and provided with a light reflecting section having light reflectivity, wherein
- the movable section includes the light reflection plate fixed to a base, a center of gravity of the light reflection plate being shifted from a center of gravity of the base and the center of gravity of the base being aligned with the first axis,
- in plan view from a thickness direction of the light reflection plate, the center of gravity of the light reflection plate is shifted from the first axis,
- the light reflection plate is formed in a shape symmetrical with respect to an axis through the center of gravity of the light reflection plate and parallel to the first axis, and
- the light reflection plate is fixed to the base such that the axis through the center of gravity of the light reflection plate is not aligned with the first axis through the center of gravity of the base.

14. An image display apparatus comprising:
- a movable section capable of swinging about a first axis;
- a frame body section capable of swinging about a second axis crossing the first axis;
- a first shaft section configured to connect the movable section and the frame body section; and
- a light reflection plate fixed to the movable section and provided with a light reflecting section having light reflectivity, wherein
- the movable section includes the light reflection plate fixed to a base, a center of gravity of the light reflection plate being shifted from a center of gravity of the base and the center of gravity of the base being aligned with the first axis,
- in plan view from a thickness direction of the light reflection plate, the center of gravity of the light reflection plate is shifted from the first axis,
- the light reflection plate is formed in a shape symmetrical with respect to an axis through the center of gravity of the light reflection plate and parallel to the first axis, and
- the light reflection plate is fixed to the base such that the axis through the center of gravity of the light reflection plate is not aligned with the first axis through the center of gravity of the base.

15. The optical device according to claim 1, wherein the movable section includes the light reflection plate fixed to a base by a spacer, the spacer being fixed to a bottom surface of the light reflection plate and a top surface of the base and separating the light reflection plate from the base.

16. An optical device comprising:
- a movable section capable of swinging about a first axis;
- a frame body section capable of swinging about a second axis crossing the first axis;
- a first shaft section configured to connect the movable section and the frame body section; and
- a light reflection plate fixed to the movable section and provided with a light reflecting section having light reflectivity, wherein
- the movable section includes the light reflection plate fixed to a base, a center of gravity of the light reflection plate being shifted from a center of gravity of the base, the center of gravity of the light reflection plate being aligned with the second axis and shifted from the first axis, and the center of gravity of the base being aligned with the first axis,
- the light reflection plate is formed in a shape symmetrical with respect to an axis through the center of gravity of the light reflection plate and parallel to the first axis, and the light reflection plate is fixed to the base such that the axis through the center of gravity of the light reflection plate is not aligned with the first axis through the center of gravity of the base.

\* \* \* \* \*